United States Patent
Fukuda et al.

(10) Patent No.: US 9,870,182 B2
(45) Date of Patent: Jan. 16, 2018

(54) INFORMATION PROCESSING APPARATUS, PRINTING SYSTEM, AND INFORMATION PROCESSING METHOD, CONFIGURED TO PRESENT ACQUIRED SETTING VALUES AS CANDIDATE SETTING VALUES IN PRINT SETTING INTERFACE

(71) Applicants: Masahiro Fukuda, Tokyo (JP); Yuu Yamashita, Kanagawa (JP); Teruyoshi Yamamoto, Tokyo (JP); Akira Teruya, Kanagawa (JP)

(72) Inventors: Masahiro Fukuda, Tokyo (JP); Yuu Yamashita, Kanagawa (JP); Teruyoshi Yamamoto, Tokyo (JP); Akira Teruya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/256,995

(22) Filed: Sep. 6, 2016

(65) Prior Publication Data
US 2017/0068494 A1 Mar. 9, 2017

(30) Foreign Application Priority Data

Sep. 7, 2015 (JP) .................................. 2015-175274
Jul. 27, 2016 (JP) .................................. 2016-147377

(51) Int. Cl.
*G06F 3/12* (2006.01)
*G06K 15/02* (2006.01)

(52) U.S. Cl.
CPC .......... *G06F 3/1257* (2013.01); *G06F 3/1205* (2013.01); *G06F 3/1273* (2013.01);
(Continued)

(58) Field of Classification Search
None
See application file for complete search history.

(56) References Cited

U.S. PATENT DOCUMENTS

| 2006/0092479 A1* | 5/2006 | Dohi | G06F 3/1214 |
| | | | 358/452 |
| 2012/0194862 A1* | 8/2012 | Fukuda | G06F 3/1204 |
| | | | 358/1.15 |
| 2012/0307262 A1 | 12/2012 | Fukuda et al. | |

FOREIGN PATENT DOCUMENTS

| JP | 2002-044344 | 2/2002 |
| JP | 2004-246733 | 9/2004 |

(Continued)

*Primary Examiner* — Andrew H Lam
(74) *Attorney, Agent, or Firm* — Cooper & Dunham LLP

(57) ABSTRACT

An information processing apparatus includes circuitry. The circuitry is configured to provide a print setting interface for setting print setting values for various print setting items, acquire, as specific print setting data, a specific print setting item having many print setting values to be set, among the print setting items, and a specific print setting value set for the specific print setting item, acquire a relevant print setting value set for a relevant print setting item associated with the specific print setting item, acquire the specific print setting value associated with the relevant print setting value among print setting values registered in both the specific print setting data and history print setting data that is the print setting values set for the print setting items, and present the acquired specific print setting value in the print setting interface as a candidate for the specific print setting value.

10 Claims, 25 Drawing Sheets

(52) U.S. Cl.
CPC ......... *G06F 3/1282* (2013.01); *G06K 15/021* (2013.01); *G06K 15/1805* (2013.01)

(56) References Cited

FOREIGN PATENT DOCUMENTS

| | | |
|---|---|---|
| JP | 3703376 | 7/2005 |
| JP | 2006-127281 | 5/2006 |

\* cited by examiner

FIG.4

| PRINT SETTING SCREEN | PAPER SETTING | PRINT CATEGORY (SETTING OF PRINT SETTING SCREEN (IMPOSITION: BOOKBINDING)) | | | | |
|---|---|---|---|---|---|---|
| | | NORMAL | BOOKBINDING | | SPEED/REPEAT | |
| | PAPER SETTING | NORMAL | MINI-BOOK | WEEKLY MAGAZINE | SPEED | REPEAT |
| IMPOSITION: BOOKBINDING | COVER | × | × | ○ | × | × |
| JOB PAPER | JOB PAPER | ○ | ○ | ○ | ○ | ○ |
| EXCEPTION PAGE | COVER | ○ | × | × | × | ○ |
| | INSERT PAPER | ○ | × | × | × | ○ |
| | INDEX PAPER | ○ | ○ | ○ | × | × |
| | EXCEPTION PAPER | ○ | ○ | ○ | ○ | ○ |

PAPER LIST DATABASE PD

HISTORY PRINT SETTING DATABASE RD

[PRINT DATE AND TIME], [PRINT CATEGORY], [PAPER SETTING/PAPER NAME], [PAPER SETTING/PAPER NAME], [···/···]

15/01/30 11:00:00, NORMAL, JOB PAPER/A4LEF engine, EXCEPTION PAPER/TABSTOCK

15/01/30 11:01:00, WEEKLY MAGAZINE, JOB PAPER/body, COVER/cover

15/01/30 11:02:00, MINI-BOOK, JOB PAPER/A4LEF engine, EXCEPTION PAPER/body

FIG.8

PAPER LIST PL

| | PAPER NAME | TRAY | SIZE | BASIS WEIGHT |
|---|---|---|---|---|
| | TABSTOCK | | A4 (210×297 mm) | BASIS WEIGHT 2 (63.1-80.0 g/m2) |
| | TABSTOCK 2 | | A4 (210×297 mm) | BASIS WEIGHT 2 (63.1-80.0 g/m2) |
| | A4 LEF engine | | A4 (297×420 mm) | BASIS WEIGHT 2 (63.1-80.0 g/m2) |
| | cover | | A4 (210×297 mm) | BASIS WEIGHT 2 (63.1-80.0 g/m2) |
| | Letter_SEF | ☑ A | | |
| | A4/SEF-ormal | | A4 (210×297 mm) | BASIS WEIGHT 2 (63.1-80.0 g/m2) |

PAPER LIST EDITING SCREEN G1

PAPER ATTRIBUTES PZ

DISPLAY

PAPER NAME                  TABSTOCK
OVERVIEW
 SIZE                       210.0×297.0 mm
                            A4 (210×297 mm)
 WIDTH                      210 mm
 HEIGHT                     297 mm
 PAPER FEED DIRECTION       LONG SIDE FEED
 AUTOMATIC PAPER            YES
 SELECTION
 BASIS WEIGHT               BASIS 2 (63.1-80.0 g/m2)
 ALLOW TWO-SIDED PRINTING   NO
 COLOR                      WHITE
 TYPE                       INDEX PAPER
 TAB PRINTING METHOD        SHIFT
 NUMBER OF TABS             1
 TAB SHIFT                  127 mm
DETAILS
 NEED TO DISTINGUISH        NO
 BETWEEN SIDES
 NEED TO DISTINGUISH
 BETWEEN SURFACES
 COATED PAPER               NO
 UNEVEN PAPER               NONE
 PUNCHED PAPER              NONE
 NAME                       PLAIN PAPER (JAPAN)

PAPER LIST DATABASE PD

| PRINT SETTING SCREEN | PAPER SETTING | PRINT CATEGORY (SETTING OF PRINT SETTING SCREEN (IMPOSITION: BOOKBINDING)) | | | | |
|---|---|---|---|---|---|---|
| | | NORMAL | BOOKBINDING | | SPEED/REPEAT | |
| | | NORMAL | MINI-BOOK | WEEKLY MAGAZINE | SPEED | REPEAT |
| IMPOSITION: BOOKBINDING | COVER | × | × | ○ | × | × |

\* ○ INDICATES "SETTING IS POSSIBLE", AND × INDICATES "SETTING IS NOT POSSIBLE"

FIG.14

| PRINT SETTING SCREEN | JOB PAPER | PRINT CATEGORY (SETTING OF PRINT SETTING SCREEN (IMPOSITION: BOOKBINDING)) | | | | |
|---|---|---|---|---|---|---|
| | | NORMAL | BOOKBINDING | | SPEED/REPEAT | |
| | | NORMAL | MINI-BOOK | WEEKLY MAGAZINE | SPEED | REPEAT |
| JOB PAPER | JOB PAPER | ○ | ○ | ○ | ○ | ○ |

PAPER LIST DATABASE PD

* ○ INDICATES "SETTING IS POSSIBLE", AND × INDICATES "SETTING IS NOT POSSIBLE"

| PRINT SETTING SCREEN | PAPER SETTING | PRINT CATEGORY (SETTING OF PRINT SETTING SCREEN (IMPOSITION: BOOKBINDING)) ||||| PAPER LIST DATABASE PD |
| --- | --- | --- | --- | --- | --- | --- |
| | | NORMAL | BOOKBINDING || SPEED/REPEAT ||
| | | NORMAL | MINI-BOOK | WEEKLY MAGAZINE | SPEED | REPEAT |
| | COVER | ○ | × | × | × | ○ |
| | INSERT PAPER | ○ | × | × | × | ○ |
| | INDEX PAPER | ○ | ○ | ○ | × | × |
| PRINT SETTING SCREEN (EXCEPTION PAGE) | EXCEPTION PAPER | ○ | ○ | ○ | ○ | ○ |

| PAPER NAME | OVERVIEW OF PAPER | SIZE | BASIS WEIGHT |
|---|---|---|---|
| A4LEF engine | 210.0×297.0 mm | A4 (210×297 mm) | 80 |
| Letter_SEF | 8.5×11.0 in | Letter (8.5×11) | 80 |
| TABSTOCK | 210.0×297.0 mm | A4 (210×297 mm) | 80 |
| TABSTOCK2 | 210.0×297.0 mm | A4 (210×297 mm) | 80 |
| body | 210.0×297.0 mm | A4 (210×297 mm) | 80 |
| cover | 297.0×420.0 mm | A3 (297×420 mm) | 105 |

FIG.20

HISTORY PRINT SETTING
DATABASE
RD

[PRINT DATE AND TIME], [PRINT CATEGORY], [PAPER SETTING/PAPER NAME], [PAPER SETTING/PAPER NAME], [···/···]

15/01/30 11:00:00, NORMAL, JOB PAPER/A4LEF engine, EXCEPTION PAPER/TABSTOCK

15/01/30 11:01:00, WEEKLY MAGAZINE, JOB PAPER/body, JOB PAPER/A4LEF engine, EXCEPTION PAPER/body, COVER/cover 15/01/30 11:02:00, MINI-BOOK, JOB PAPER/A4LEF engine, EXCEPTION PAPER/body

FIG.21

| cover |
|---|

FIG.22

| PAPER NAME | OVERVIEW OF PAPER | SIZE | BASIS WEIGHT |
|---|---|---|---|
| cover | 297.0×420.0 mm | A3 (297×420 mm) | 105 |

FIG.23

HISTORY COLOR PROFILE PRINT SETTING DATABASE CD

| No. | PAPER INFORMATION | OUTPUT INFORMATION | INPUT COLOR PROFILE | OUTPUT COLOR PROFILE |
|---|---|---|---|---|
| 1 | MATTE PAPER | 1up PRINTING | sRGB Profile | MATTE PROFILE |
| 2 | GLOSSY PAPER | BOOKBINDING PRINTING | AdobeRGB Profile | GLOSSY PROFILE |

INFORMATION PROCESSING APPARATUS, PRINTING SYSTEM, AND INFORMATION PROCESSING METHOD, CONFIGURED TO PRESENT ACQUIRED SETTING VALUES AS CANDIDATE SETTING VALUES IN PRINT SETTING INTERFACE

CROSS-REFERENCE TO RELATED APPLICATIONS

The present application claims priority under 35 U.S.C. §119 to Japanese Patent Application No. 2015-175274, filed Sep. 7, 2015; and Japanese Patent Application No. 2016-147377, filed Jul. 27, 2016. The contents of which are incorporated herein by reference in their entirety.

BACKGROUND OF THE INVENTION

1. Field of the Invention

The present invention relates to information processing apparatuses, printing systems, and information processing methods, and in particular, relates to an information processing apparatus, a printing system, and an information processing method.

2. Description of the Related Art

An image forming apparatus forms an image by placing a recording agent corresponding to an image forming method on a recording medium, such as plain paper, recycled paper, coated paper, and a film.

Therefore, an image having a required print quality is printed out by performing printing with the amount of recording agent, color settings, and the like corresponding to recording medium attribute information including a number of information, such as a size (A3, A4, letter, and the like), a type (plain paper, recycled paper, coated paper, a film, and the like), and weight.

In addition, in known printing, a combination of such pieces of recording medium attribute information is managed as a recording medium list (hereinafter, simply referred to as a paper list). In the printing, a user designates a paper list to perform print setting, such as the amount of recording agent and color settings, based on the recording medium attribute information (hereinafter, simply referred to as paper attribute information) of the designated paper list, thereby ensuring the required print quality.

In addition, in color printing, an image forming apparatus stores various kinds of conversion information required to convert input image data, such as RGB image data, into output image data corresponding to an output device, such as CMY data, as a number of color profiles. Then, in the printing, the image forming apparatus performs print setting according to the selection of the user from a number of color profiles, thereby ensuring the required color print quality.

However, there are many paper lists or many color profiles. Accordingly, during the print setting, it is difficult for the user to select an appropriate paper list or an appropriate color profile from a number of paper lists or color profiles in order to obtain an intended print result. This leads to poor workability.

For example, Japanese Unexamined Patent Application Publication No. 2002-044344 discloses an information processing apparatus that generates print data to be printed by an image input and output device through a network. The information processing apparatus includes: an instruction input unit that inputs an instruction to acquire paper type information, which indicates the type of a medium of the image input and output device, from a user interface provided by a printer driver; a request unit that sends a request for transmission of the paper type information to the image input and output device through a network based on the instruction input by the instruction input unit using a device information acquisition module used in a network device management utility that manages the image input and output device; an acquisition unit that acquires the paper type information from the image input and output device through the device information acquisition module in response to the request from the request unit; and a reflection unit that reflects the paper type information of the image input and output device acquired by the acquisition unit on the user interface provided by the printer driver.

In such a proposed information processing apparatus, however, paper type information is displayed by the printer driver that acquires the paper type information indicating the type of a medium of the image input and output device. Accordingly, paper types stored in the image input and output device can be selected by the printer driver, but the user should select a paper type suitable for an intended print result among a number of paper types since the information of all paper types stored in the image input and output device is reflected on the user interface of the printer driver. For this reason, there has been a problem that not only is the selection of an appropriate paper type difficult but also workability is poor.

SUMMARY OF THE INVENTION

According to one aspect of the present invention, an information processing apparatus includes circuitry and a storage. The circuitry is configured to provide a print setting interface for setting print setting values for various print setting items, acquire, as specific print setting data, a specific print setting item for which there are many print setting values to be set, among the print setting items, and a specific print setting value set for the specific print setting item, acquire a relevant print setting value set for a relevant print setting item associated with the specific print setting item, acquire the specific print setting value associated with the relevant print setting value among print setting values registered in both the specific print setting data and history print setting data that is the print setting values set for the print setting items, and present the acquired specific print setting value in the print setting interface as a candidate for the specific print setting value for the specific print setting item. The storage is configured to store the history print setting data.

BRIEF DESCRIPTION OF THE DRAWINGS

FIG. 4 is a diagram illustrating an example of a paper list database;

FIG. 8 is a diagram illustrating an example of a paper list editing screen;

FIG. 11 is a diagram illustrating an example of an imposition and bookbinding print setting screen;

FIG. 12 is a diagram illustrating an example of a paper list database in imposition and bookbinding;

FIG. 14 is a diagram illustrating an example of a paper list database in a job paper;

FIG. 15 is a diagram illustrating an example of an exception page print setting screen;

FIG. 16 is a diagram illustrating an example of a paper list database in an exception page;

FIG. 20 is an explanatory view of paper extraction from a history print setting database based on a print category and paper settings;

FIG. 21 is a diagram illustrating an example of paper extracted from the history print setting database;

FIG. 22 is a diagram illustrating an example of a paper list extracted from the paper list database for the paper illustrated in FIG. 21;

FIG. 23 is a diagram illustrating an example of a history color profile print setting database of a second embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
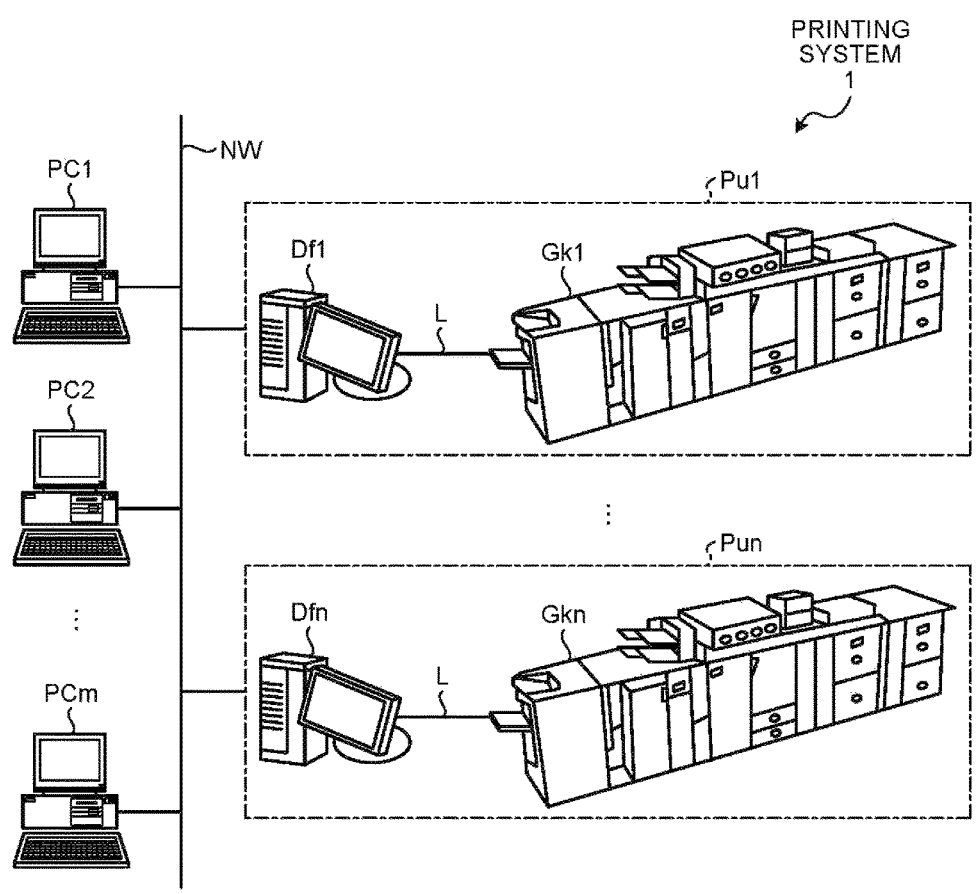
FIG. 1 is a diagram illustrating the configuration of a printing system of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to enable easy selection of a print setting value, which is suitable for an intended print result, for a print setting item for which there are many print setting values to be set in print setting.

Hereinafter, preferred embodiments of the invention will be described in detail with reference to the accompanying diagrams. In addition, since the embodiments described below are preferred embodiments of the invention, technically preferable various limitations are imposed. However, the scope of the invention is not unduly limited by the following description, and all components described in the present embodiment are not essential components of the invention.

First Embodiment

FIGS. 1 to 22 are diagrams illustrating a first embodiment of an information processing apparatus, a printing system, an information processing method, a printing method, and a program. FIG. 1 is a block diagram of a printing system 1 of the first embodiment.

In FIG. 1, in the printing system 1, a plurality of printing units Pu1 to Pun and a plurality of computers PC1 to PCm are connected to a wired or wireless or wired and wireless network NW, such as a LAN (local area network) or the Internet.

The printing units (image forming apparatuses) Pu1 to Pun include DFE devices Df1 to Dfn and image output devices Gk1 to Gkn, respectively. The image output devices Gk1 to Gkn are connected to the DFE devices Df1 to Dfn, respectively. The DFE devices Df1 to Dfn are respectively connected to the image output devices Gk1 to Gkn through at least either wired or wireless communication line L. In addition, in FIG. 1, in each of the printing units Pu1 to Pun, one image output device Gk1, . . . , or Gkn is connected to one DFE device Df1, . . . , or Dfn. However, a plurality of image output devices Gk1 to Gkn may be connected to one DFE device Df1, . . . , or Dfn.

In addition, in the printing system 1, since the DFE devices Df1 to Dfn and the image output devices Gk1 to Gkn are housed in separate housings, the DFE devices Df1 to Dfn and the image output devices Gk1 to Gkn are separate entities. However, an image forming apparatus may be used in which each DFE device and each image output device are housed in a single housing. In this case, each of the image output devices Gk1 to Gkn becomes an image forming apparatus in which an image processor for performing image processing of each DFE device is built.

In the computers (information processing apparatuses) PC1 to PCm, a printer driver generates a print request (print job) including print data and print settings, in an arbitrary PDL (Page Description Language), from data and print settings created by the mounted application. The computers PC1 to PCm transmit the generated print request to the DFE devices Df1 to Dfn. The computers PC1 to PCm transmit the print request to the DFE devices Df1 to Dfn together with paper type information based on a paper list to be described later. That is, when sending a print request to the DFE devices Df1 to Dfn, the computers PC1 to PCm transmit paper type information, which is appropriately selected by the user from the paper list provided from the DFE devices Df1 to Dfn, to the DFE devices Df1 to Dfn together with the print request.

As the image output devices Gk1 to Gkn, a printer apparatus or the like is used. Based on the print job from the DFE devices Df1 to Dfn, the image output devices Gk1 to Gkn print out an image on a recording medium (hereinafter, simply referred to as paper), such as paper or a film, using a predetermined printing method, for example, an electrophotographic method or an ink jet method.

Figure 2:
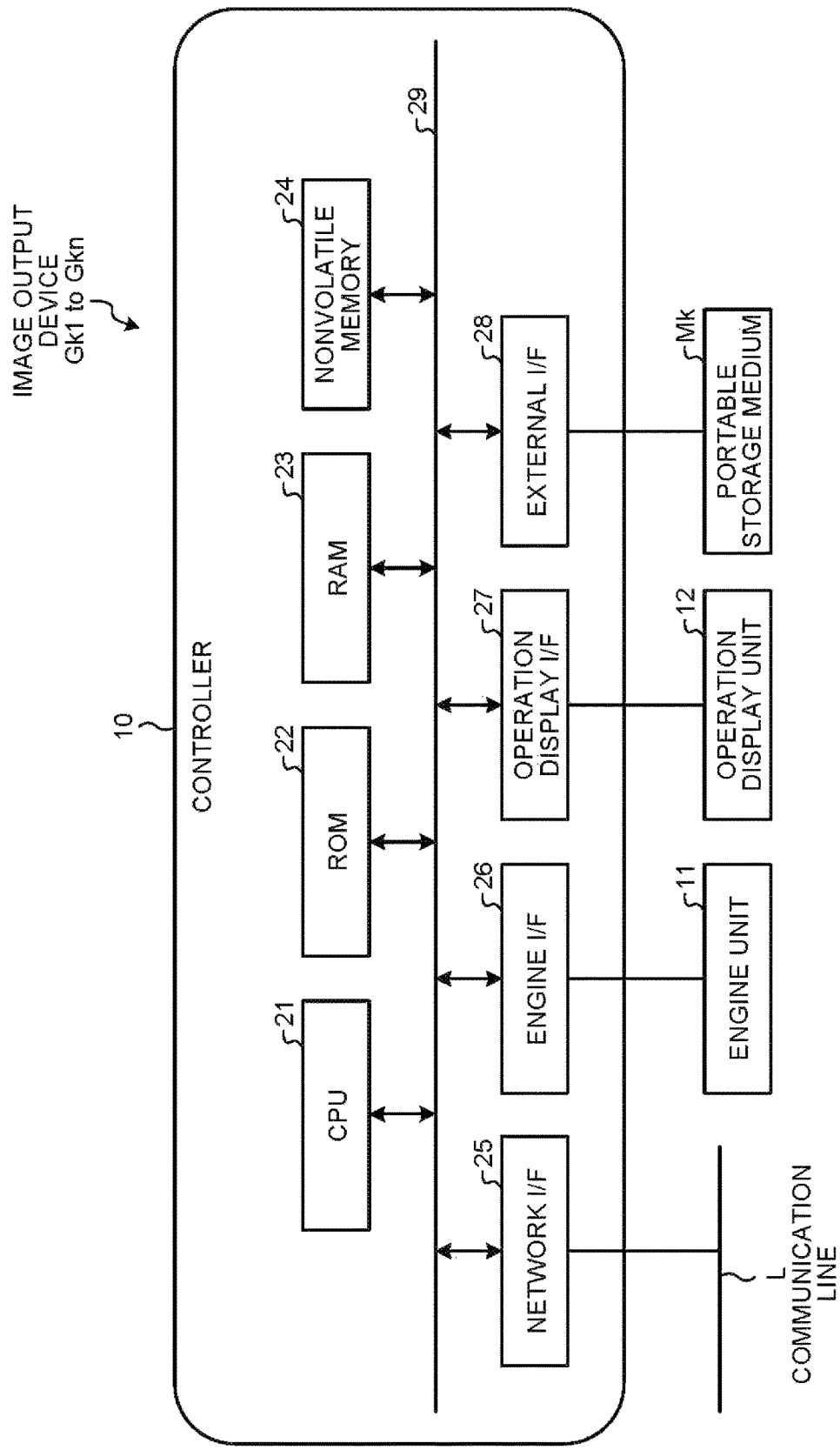
FIG. 2 is a block diagram of an image output device.

Each of the image output devices Gk1 to Gkn includes a controller 10, an engine unit 11, an operation display unit 12, and the like, as illustrated in FIG. 2. The controller 10 includes a CPU (Central Processing Unit) 21, ROM (Read Only Memory) 22, RAM (Random Access Memory) 23, nonvolatile memory 24, a network I/F 25, an engine I/F 26, an operation display I/F 27, an external I/F 28, and the like. The respective units of the controller 10 are connected to each other through a bus 29.

In the engine unit 11, for example, in the case of a tandem type electrophotographic method, image forming units for respective colors of, for example, special color, black (K), magenta (M), cyan (C), and yellow (Y) are disposed along a conveyor belt. For example, each image forming unit includes an optical writing unit, a developing unit, a charging unit, a cleaning unit, and the like around a photoconductor. Then, in the image forming unit of each color, the engine unit 11 operates the optical writing unit with drawing data (image data) of each color received from the controller 10, thereby forming an electrostatic latent image on the photoconductor. In the image forming unit of each color, the engine unit 11 develops the electrostatic latent image by supplying the toner of each color onto the photoconductor from the developing unit, thereby forming a toner image of each color. Then, the engine unit 11 feeds paper (recording medium) between the photoconductor and a transfer unit from a paper feeding unit, so that the respective toner images on the photoconductor are sequentially transferred onto the paper so as to be superimposed on each other. The engine unit 11 conveys the paper, onto which the toner images have been transferred, to a fixing unit, so that the fixing unit fixes the toner images on the paper by heating and pressure. Thus, a color image is formed, and a printed matter is output. In addition, for the engine unit 11, image forming units of the respective colors may be disposed, for example, along an intermediate transfer belt, without being limited to a case in which the image forming units of the respective colors are disposed along the conveyor belt.

In the operation display unit 12, various operation keys, such as a numeric keypad, a clear stop key, a start key, a reset key, and a program key, a display, and the like are provided. By using the operation keys, commands for making the image output devices Gk1 to Gkn perform various operations are input to the operation display unit 12.

As a display of the operation display unit 12, for example, an LCD (Liquid Crystal Display) with a touch panel is used in which a touch panel for detecting a touch operation is provided on the upper surface of the LCD (Liquid Crystal Display). The display displays and outputs various kinds of information of which the user is to be notified from the image output devices Gk1 to Gkn or various kinds of information, such as the operation content of the operation keys.

The controller 10 stores, in the ROM 22, programs and the various kinds of required data for controlling the processing or management of data in the controller 10 and peripheral modules. Specifically, the ROM 22 stores various programs, such as a basic processing program as the image output devices Gk1 to Gkn and firmware, and stores various kinds of data required for executing these programs.

The CPU 21 performs various kinds of image processing by controlling each unit of the image output devices Gk1 to Gkn based on the program stored in the ROM 22 while using the RAM 23 as a work memory.

The RAM 23 is used as a work memory of the CPU 21. In addition, the RAM 23 is used as a buffer that temporarily stores print data from the computer, a bit map memory expanded by converting the print data into drawing data suitable for actual printing, and the like.

As the nonvolatile memory 24, for example, NVRAM (Nonvolatile Random Access Memory), an SSD (Solid State Drive), or a hard disk is used. The nonvolatile memory 24 is a memory that holds the stored content even when the power of the image output devices Gk1 to Gkn is OFF. For example, various kinds of data, such as system setting values, are stored in the nonvolatile memory 24, as data that needs to be held even when the power of the image output devices Gk1 to Gkn is OFF, under the control of the CPU 21.

The network I/F 25 is connected to the communication line L, and performs communication with the DFE devices Df1 to Dfn through the communication line L.

The engine unit 11 is connected to the engine I/F 26. Through the engine I/F 26, a control signal or data, such as drawing data, is output from the controller 10 to the engine unit 11, and each signal, such as a status signal, is transmitted from the engine unit 11 to the controller 10.

The operation display I/F 27 is connected to the operation display unit 12, so that the communication of signals is performed between the CPU 21 and the operation display unit 12.

A portable storage medium Mk is mounted in the external I/F 28 so as to be separable from the external I/F 28. The portable storage medium Mk is an IC (Integrated Circuit), an SD (Secure Digital) card, a flash memory card, or the like. Various kinds of data are written into and read from the portable storage medium Mk under the control of the CPU 21.

Figure 3:
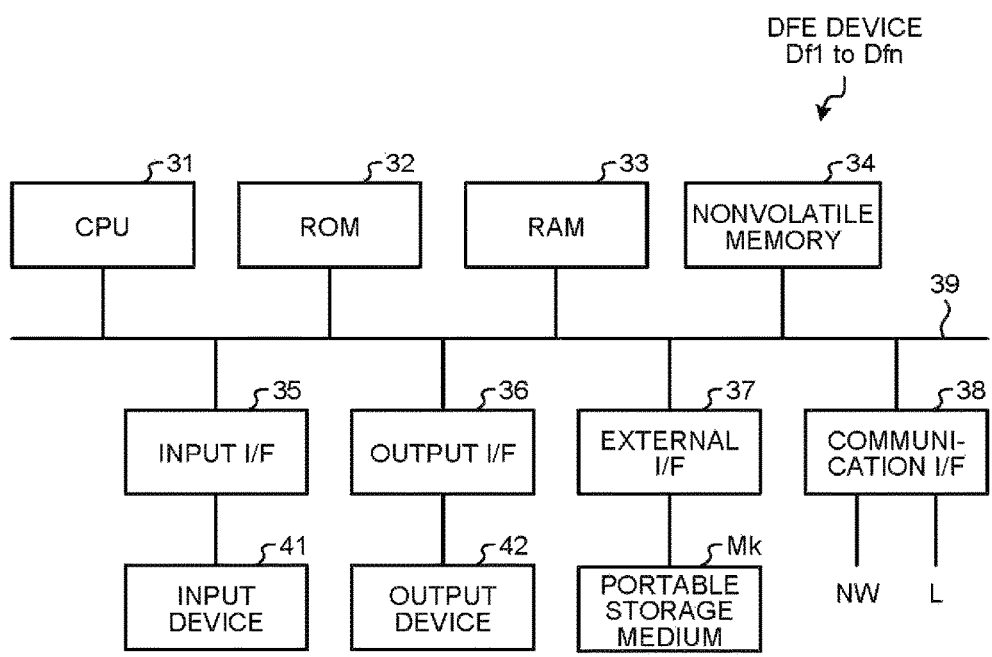
FIG. 3 is a block diagram of a DFE device.

As illustrated in FIG. 3, each of the DFE devices Df1 to Dfn includes a CPU 31, ROM 32, RAM 33, nonvolatile memory 34, an input I/F 35, an output I/F 36, an external I/F 37, a communication I/F 38, and the like, and the respective units are connected to each other through a bus 39.

The ROM 32 stores a program, system data, and the like to be executed by the DFE devices Df1 to Dfn among the basic program as the DFE devices Df1 to Dfn and the information processing method and the printing method.

The RAM 33 is used as a work memory of the CPU 31, and stores image data, other kinds of data, and the like.

The CPU 31 performs basic processing as the DFE devices Df1 to Dfn by controlling each unit of the DFE devices Df1 to Dfn based on the program stored in the ROM 32 while using the RAM 33 as a work memory. In addition, the CPU 31 executes one of the information processing method and the printing method, which is to be executed by the DFE devices Df1 to Dfn, based on the programs of the information processing method and the printing method that are stored in the ROM 32.

As the nonvolatile memory 34, NVRAM, an SSD, a hard disk, and the like are used. The nonvolatile memory 34 is a memory that holds the stored content even when the power of the DFE devices Df1 to Dfn is OFF. For example, system setting values or various kinds of data used in the information processing method and the printing method are stored in the nonvolatile memory 34, as data that needs to be held even when the power of the DFE devices Df1 to Dfn is OFF, under the control of the CPU 31.

In particular, the nonvolatile memory 34 stores a paper list database PD as paper print setting data illustrated in FIG. 4. The paper list database PD is a paper list showing a paper type based on a combination of many attributes, such as a paper size, a paper type (plain paper, recycled paper, coated paper, matte paper, glossy paper, and the like), and basis weight. The paper type is combined with the print settings, such as the amount of ink and color settings, under the good conditions. Thus, the quality of printing is determined. For example, as illustrated in FIG. 4, the paper list database PD includes items of a print setting screen, a paper setting item, and a print category item. The print category item includes small items of normal, bookbinding, and speed/repeat, and the bookbinding includes small items of mini-book and weekly magazine. In addition, the small item of speed/repeat includes small items of speed and repeat.

The print category is information that classifies the type of printing (purpose of printing). For example, the print category is information for folding the paper printed by the printing units (image forming apparatuses) Pu1 to Pun into two parts using a post-processing machine (bookbinding printing) or information for cutting the paper printed by the printing units (image forming apparatuses) Pu1 to Pun. In addition, the print category is information regarding how to impose the data of a print source on a print medium (paper). Imposition is to collectively print multiple pages on a sheet of paper (Nup printing). For example, the imposition is to allocate the data of one page of original data to one surface (1up printing) or allocate the data of two pages of original data to one surface (2up printing).

An input device 41, such as a keyboard, a mouse, a stylus pen, and a touch panel, is connected to the input I/F 35, and the input I/F 35 outputs various commands, which are input from the input device 41, to the CPU 31. In particular, an operation of editing the paper list database PD, which will be described later, is performed by using the input device 41, and the CPU 31 performs registration, editing, deletion, or the like for the paper list database PD of the nonvolatile memory 34 according to the operation of editing the paper list database PD that is operated through the input device 41.

An output device 42, such as a display, a lamp, and a speaker, is connected to the output I/F 36, and the output I/F 36 outputs output data, such as display data, flashing data, and sound data, to the output device 42 under the control of the CPU 31. As the display, a display with a touch panel may be used.

The portable storage medium Mk is mounted in the external I/F 37 so as to be separable from the external I/F 37. The portable storage medium Mk is an IC, an SD card, a flash memory card, or the like. Various kinds of data are written into and read from the portable storage medium Mk under the control of the CPU 31. In particular, through the external I/F 37, the paper list database PD is stored in the portable storage medium Mk by being written thereinto, and the paper list database PD stored in the portable storage medium Mk is read, under the control of the CPU 31.

The DFE devices Df1 to Dfn transmit the paper list database PD under their management to the computers PC1 to PCm at an appropriate timing.

The communication line L or the network NW is connected to the communication I/F 38, so that the communication I/F 38 communicates with the image output devices Gk1 to Gkn through the communication line L and communicates with the computers PC1 to PCm through the network NW.

Figure 5:
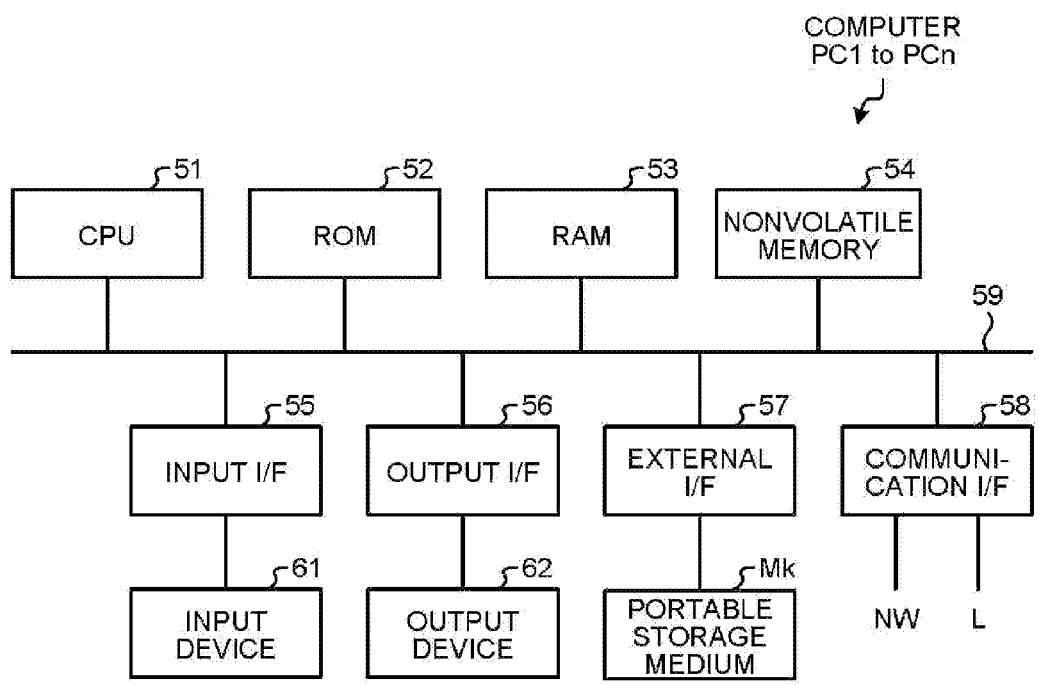
FIG. 5 is a block diagram of a computer.

Computers having normal hardware and software configurations are used as the computers PC1 to PCm, and a program for executing the information processing method is mounted as software. As illustrated in FIG. 5, each of the computers PC1 to PCm includes a CPU 51, ROM 52, RAM 53, nonvolatile memory 54, an input I/F 55, an output I/F 56, an external I/F 57, a communication I/F 58, and the like, and the respective units are connected to each other through a bus 59.

The ROM 52 stores a basic program as the computers PC1 to PCm, a program of the information processing method, system data, and the like.

The RAM 53 is used as a work memory of the CPU 51, and stores image data, other kinds of data, and the like.

The CPU 51 performs basic processing as the computers PC1 to PCm by controlling each unit of the computers PC1 to PCm based on the program stored in the ROM 52 while using the RAM 53 as a work memory. In addition, the CPU 51 executes the information processing method based on the program of the information processing method stored in the ROM 52.

Figure 6:
FIG. 6 is a diagram illustrating an example of a history print setting database.

As the nonvolatile memory 54, NVRAM, an SSD, a hard disk, and the like are used. The nonvolatile memory 54 is a memory that holds the stored content even when the power of the computers PC1 to PCm is OFF. For example, system setting values or various kinds of data used in the information processing method are stored in the nonvolatile memory 54, as data that needs to be held even when the power of the computers PC1 to PCm is OFF, under the control of the CPU 51. In particular, the nonvolatile memory 54 receives the paper list database PD illustrated in FIG. 4 from the DFE devices Df1 to Dfn and stores the paper list database PD. In addition, a history print setting database RD illustrated in FIG. 6 is stored in the nonvolatile memory 54 by the CPU 51. The history print setting database RD is a database including the content of the past print settings as history print settings. In the present embodiment, as illustrated in FIG. 6, "print date and time", "print category", and a plurality of "paper settings/paper names" are registered. In addition, although FIG. 6 illustrates a state of the history print setting database RD in which data of history print settings is recorded in a CSV (comma-separated values) format, the history print setting database RD is not limited to the CSV format. In addition, in the history print setting database RD illustrated in FIG. 6, as history print settings, only "print date and time", "print category", and a plurality of "paper settings/paper names" are extracted and registered as data required to narrow down the paper list. However, the print settings are not limited to these. For example, in the history print setting database RD, all print settings used in printing, which include a color profile to be described later, may be registered as history print settings.

An input device 61, such as a keyboard, a mouse, a stylus pen, and a touch panel, is connected to the input I/F 55, and the input I/F 55 outputs various commands, which are input from the input device 61, to the CPU 51. In particular, a print setting operation using the paper list database PD and the history print setting database RD, which will be described later, is performed by using the input device 61, and the CPU 51 performs print setting according to the print setting operation that is operated through the input device 61.

An output device 62, such as a display, a lamp, and a speaker, is connected to the output I/F 56, and the output I/F 56 outputs output data, such as display data, flashing data, and sound data, to the output device 62 under the control of the CPU 51. In particular, a print setting screen or the like provided by the printer driver is displayed on a display as the output device 62 under the control of the CPU 51.

The portable storage medium Mk is mounted in the external I/F 57 so as to be separable from the external I/F 57. The portable storage medium Mk is an IC, an SD card, a flash memory card, or the like. Various kinds of data are written into and read from the portable storage medium Mk under the control of the CPU 51. In particular, through the external I/F 57, the history print setting database RD is stored in the portable storage medium Mk by being written thereinto, and the history print setting database RD stored in the portable storage medium Mk is read, under the control of the CPU 51.

The computers PC1 to PCm receive the paper list database PD stored in the DFE devices Df1 to Dfn from the DFE devices Df1 to Dfn at an appropriate timing.

The communication line L or the network NW is connected to the communication I/F 58, so that the communication I/F 58 communicates with the DFE devices Df1 to Dfn through the network NW.

In addition, the printing system 1 is constructed as an information processing apparatus and an image forming apparatus for executing an information processing method and a printing method that enable easy selection of a setting value suitable for an intended print result, for a setting item for which there are many setting values in print setting to be described later, by reading programs for executing the information processing method and the printing method, which are recorded in computer-readable recording media, such as a ROM, an EEPROM (Electrically Erasable and Programmable Read Only Memory), an EPROM, a flash memory, a flexible disk, a CD-ROM (Compact Disc Read Only Memory), a CD-RW (Compact Disc Rewritable), a DVD (Digital Versatile Disk), a USB (Universal Serial Bus) memory, an SD (Secure Digital) card, and an MO (Magneto-Optical Disc), and loading the programs into the ROM 52 of the computers PC1 to PCm and the ROM 32 of the DFE devices Df1 to Dfn. The programs for executing the information processing method and the printing method are computer-executable programs written in legacy programming languages or object-oriented programming languages, such as assembler, C, C++, C#, and Java (registered trademark), and can be distributed in a state in which the programs are stored in the recording media described above.

Figure 7:
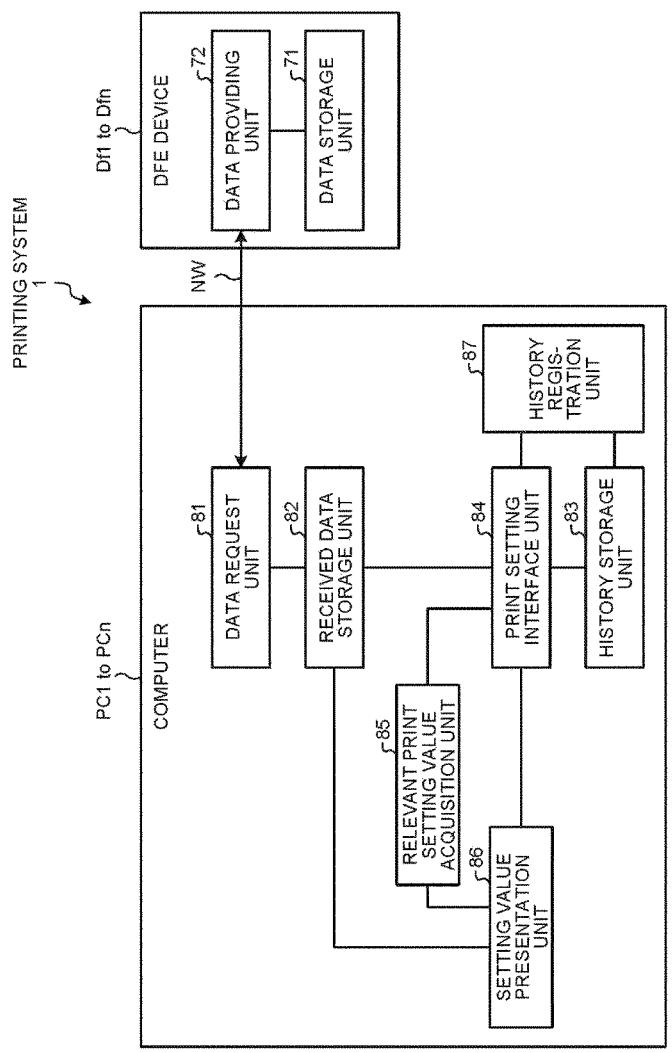
FIG. 7 is a functional block diagram of a printing system.

In the printing system 1, a functional block illustrated in FIG. 7 is constructed by loading the programs for executing the information processing method and the printing method.

That is, in the printing system 1, as illustrated in FIG. 7, a functional block is constructed in both of the DFE devices Df1 to Dfn and the computers PC1 to PCm. In the DFE devices Df1 to Dfn, a data storage unit 71 and a data providing unit 72 are constructed. In the computers PC1 to PCm, a data request unit 81, a received data storage unit 82, a history storage unit 83, a print setting interface unit 84, a relevant print setting value acquisition unit 85, a setting value presentation unit 86, and a history registration unit 87 are constructed.

First, the functional block of the DFE devices Df1 to Dfn will be described. The data storage unit 71 is constructed by the nonvolatile memory 34. The data storage unit 71 stores specific print setting value data in which attributes are set for each specific print setting value, for a specific print setting item of a specific print setting value for which there are many attributes to be set among print setting values set for the print setting item. Specifically, the data storage unit 71 stores the paper list database PD, in which a paper list is registered, as the specific print setting value data, as illustrated in FIG. 4.

The data providing unit 72 is constructed by the CPU 31 and the communication I/F 38. The data providing unit 72 provides the paper list database PD, which is a specific print setting list database stored in the data storage unit 71, to the computers PC1 to PCm in response to a request through the network NW from the computers PC1 to PCm that are information processing apparatuses.

Next, the functional block of the computers PC1 to PCm will be described. The data request unit 81 is constructed by the CPU 51 and the communication I/F 58, and sends a request for the transmission of specific print setting value data to the DFE devices Df1 to Dfn forming parts of the image output devices Gk1 to Gkn that are image forming apparatuses. Specifically, the computers PC1 to PCm send a data request for the transmission of the paper list database PD through the network NW from the communication I/F 58, and receive the paper list database PD that is transmitted from the DFE devices Df1 to Dfn in response to the data request.

The received data storage unit 82 is constructed by the nonvolatile memory 54, and stores the paper list database PD provided from the DFE devices Df1 to Dfn that has been received by the data request unit 81. Accordingly, the received data storage unit 82 functions as a received data storage unit.

The print setting interface unit 84 is constructed by the CPU 51 and the output device 62, in particular, a display that is one output device 62, and the display is preferably a display with a touch panel. The print setting interface unit 84 provides a print setting interface for setting print setting values for various print setting items. Specifically, the print setting interface unit 84 displays a print setting screen on a display with a touch panel when the CPU 51 executes a printer driver mounted in the computers PC1 to PCm, and acquires a result of an operation input to the print setting screen.

The history storage unit 83 is constructed by the nonvolatile memory 54, and stores the settings of print setting values for print setting items in the past printing, as history print settings, in the form of the history print setting database RD illustrated in FIG. 6.

The relevant print setting value acquisition unit 85 is constructed by the CPU 51. The relevant print setting value acquisition unit 85 acquires relevant print setting values, which are set by the print setting interface unit 84, for relevant print setting items that are associated with a specific print setting item, and transmits the relevant print setting values to the setting value presentation unit 86.

The setting value presentation unit 86 is constructed by the CPU 51. The setting value presentation unit 86 acquires a print setting value associated with the relevant print setting value (for example, a print category) acquired by the relevant print setting value acquisition unit 85, among the print setting values registered in both the specific print setting data (paper list database PD) and the history print setting data (history print setting database RD), as a specific print setting value. The setting value presentation unit 86 presents the acquired print setting value to the print setting interface unit 84 as a candidate for a specific print setting value for the specific print setting item.

The history registration unit 87 is constructed by the CPU 51. When the setting of print setting values including the specific print setting value for the print setting item provided by the print setting interface unit 84 is determined, the history registration unit 87 registers the settings of the print setting value for the print setting item in the history print setting database RD of the history storage unit 83 as history print settings.

Next, the operation of the present embodiment will be described. The printing system 1 of the present embodiment makes easy the selection of a print setting value, which is suitable for an intended print result, for a print setting item for which there are many print setting values to be set in print setting.

That is, in the printing system 1, a print request is transmitted to the printing units Pu1 to Pun from the computers PC1 to PCm, and the DFE devices Df1 to Dfn of the printing units Pu1 to Pun control the image output devices Gk1 to Gkn in response to the print request to perform printing.

In the printing system 1, the setting of print settings, which are included in the print request in this printing together with print data, is performed by the user who uses the computers PC1 to PCm. In the computers PC1 to PCm, a print setting screen is displayed on the print setting interface unit 84 so that the user can perform print setting. Specifically, in the computers PC1 to PCm, the CPU 51 operates the mounted printer driver and displays a print setting screen using the display of the output device 62, so that the user can perform print setting.

In this case, for a print setting item for which there are many print setting values, it is difficult for the user to promptly set an appropriate print setting value. In addition, this is also a troublesome work.

Therefore, in the printing system 1, the DFE devices Df1 to Dfn of the printing units Pu1 to Pun store the paper list database PD set in advance in the data storage unit 71 constructed by the nonvolatile memory 34. When there is a request for the transmission of a paper list (data request) from the computers PC1 to PCm, in the DFE devices Df1 to Dfn the data providing unit 72 transmits the paper list database PD stored in the data storage unit 71 to the computers PC1 to PCm that have sent the request.

Then, at an appropriate timing, a paper list request is sent to the DFE devices Df1 to Dfn from the data request unit 81 in the computers PC1 to PCm. When the data request unit 81 receives the paper list database PD from the DFE devices Df1 to Dfn, the paper list database PD is stored in the received data storage unit 82, which is the nonvolatile memory 54, in the computers PC1 to PCm.

In addition, in the computers PC1 to PCm, history print settings that are the settings of the past print setting values by the user are stored, as the history print setting database RD, in the history storage unit 83 that is the nonvolatile memory 54. Then, the computers PC1 to PCm propose an appropriate specific print setting value with reference to the paper list database PD and the history print setting database RD, which have been received, based on the relevant print setting values set on the print setting screen for a specific print setting item associated with a relevant print setting item.

Then, in the printing system 1 of the present embodiment, the specific print setting item is paper (recording medium), and the specific print setting item value is a paper type. In addition, in the printing system 1 of the present embodiment, the relevant print setting item is a print category.

First, processing of editing the paper list database PD in the DFE devices Df1 to Dfn will be described. The DFE devices Df1 to Dfn designate a paper list editing application, which is mounted in the DFE devices Df1 to Dfn, through the input device 41 to start the paper list editing application. Then, the CPU 31 executes the paper list editing application.

The CPU 31 displays, for example, a paper list editing screen G1 illustrated in FIG. 8 on the display of the output device 42 first by executing the paper list editing application. The paper list editing screen G1 roughly has a screen of a paper list PL and a screen of paper attributes PZ, and an add button ("+" icon) B1, an edit button (pencil icon) B2, a delete button (trash can icon) B3, and the like are further displayed on the paper list editing screen G1. The paper list PL is a list of paper registered in the paper list database PD as a specific print setting list stored in the data storage unit 71 that is the nonvolatile memory 34, and includes list items specifying the paper type, such as a paper name, a tray, a size, and weight. The paper attributes PZ is the detailed attributes of paper of a paper list selected in the paper list PL, and include detailed attributes, such as a paper name, an overview, a size, width, and height.

The add button B1 is operated when giving an instruction to add the paper list PL and the paper attributes PZ to the paper list database PD, and an edit button B2 is operated when giving an instruction to edit the paper list PL and the paper attributes PZ in the paper list database PD. The delete button B3 is operated when giving an instruction to delete the paper list PL and the paper attributes PZ from the paper list database PD. When the delete button B3 is operated in a state in which the paper list in the paper list PL is selected on the paper list editing screen G1, the CPU 31 deletes the selected paper list and the paper attributes PZ thereof.

Figure 9:
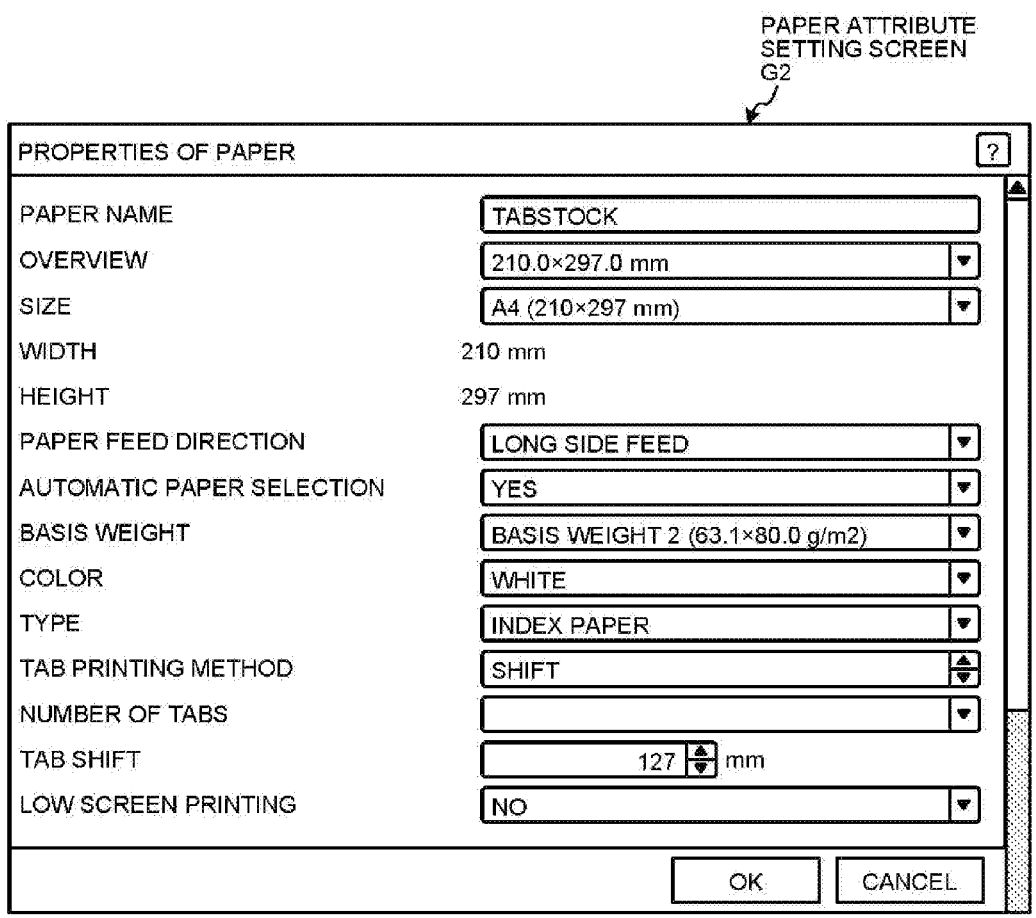
FIG. 9 is a diagram illustrating an example of a paper attribute setting screen.

When the add button B1 or the edit button B2 is operated, the CPU 31 displays a paper attribute setting screen G2 illustrated in FIG. 9 on the display of the output device 42, so that it is possible to set paper attributes using the input device 41. The CPU 31 displays attribute items of various paper attributes and setting fields of attribute values for the attribute items on the paper attribute setting screen G2, so that it is possible to set attribute values for the attribute items. The CPU 31 displays an "OK" button and a "Cancel" button on the paper attribute setting screen G2. When the "OK" button is operated, the CPU 31 registers the set paper attributes in the paper list database PD together with the paper list, and returns to the paper list editing screen G1. In addition, when the "Cancel" button is operated, the CPU 31 returns to the paper list editing screen G1 without registering the paper attributes and the paper list in the paper list database PD and editing the paper attributes and the paper list.

In the printing system 1, as described above, in a state in which the paper list database PD is stored in the data storage unit 71 of the DFE devices Df1 to Dfn, the user who uses the computers PC1 to PCm operates the input device 61 to send a print request.

In the printing system 1, a print request is made in the computers PC1 to PCm, and the print request including print data and print settings is transmitted to the DFE devices Df1 to Dfn from the computers PC1 to PCm. In the printing system 1, the DFE devices Df1 to Dfn perform printing by driving the image output devices Gk1 to Gkn in response to the print request.

When generating a print request in the printing process described above, the computers PC1 to PCm generate the print request so that the print settings input through the print setting interface unit 84 are included in the print request. The computers PC1 to PCm transmit the generated print request to the DFE devices Df1 to Dfn, or register the print settings of the print request, as history print settings, in the history print setting database RD of the history storage unit 83 when there is a response of the completion of printing from the DFE devices Df1 to Dfn.

Figure 10:
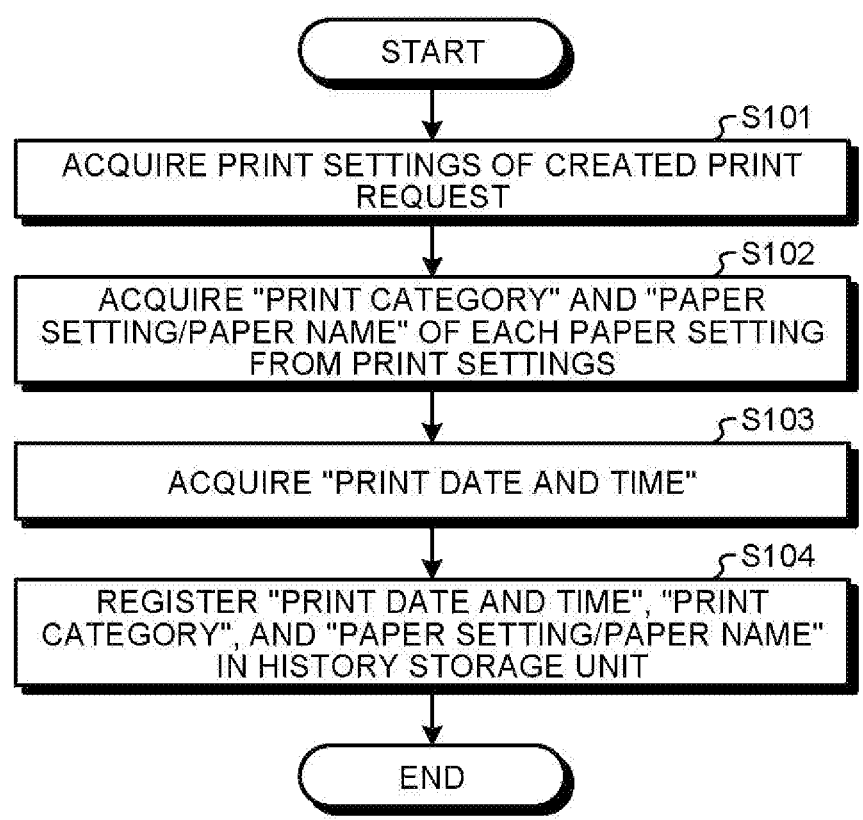
FIG. 10 is a flowchart illustrating a history registration process.

That is, the computers PC1 to PCm transmit the generated print request to the DFE devices Df1 to Dfn, or the history registration unit 87 performs a history registration process illustrated in FIG. 10 when there is a response of the completion of printing from the DFE devices Df1 to Dfn. When print setting using the print setting interface unit 84 is completed, there is a print instruction operation, and a print request based on the print setting is created, the history registration unit 87 acquires the print settings (step S101).

The history registration unit 87 acquires "print category" and "paper settings/paper name", as print setting item values, from the paper settings of print setting items in the acquired print settings (step S102).

In addition, the history registration unit 87 acquires "print date and time" from the system information of the computers PC1 to PCm (step S103). The "print date and time" is a date and time on which a print request to the DFE devices Df1 to Dfn is issued from the computers PC1 to PCm, a print date and time described in a print completion notification from the DFE devices Df1 to Dfn, or the like.

The history registration unit 87 registers the acquired "print date and time", "print category", and "paper settings/paper name", for example, in the history print setting database RD of the history storage unit 83 illustrated in FIG. 6, as history print settings, and ends the history registration process (step S104).

Then, in the computers PC1 to PCm, when there is a print request, the print setting interface unit 84 displays a print setting screen so that it is possible to set print setting values for various print setting items.

First, the procedure of print setting in the computers PC1 to PCm will be described. The computers PC1 to PCm display a print setting screen on the display of the output device 62. When an imposition and bookbinding item is selected on the print setting screen, the computers PC1 to PCm display, for example, an imposition and bookbinding print setting screen G3 illustrated in FIG. 11 on the display. The imposition and bookbinding print setting screen G3 enables the setting of print setting values for imposition and bookbinding that is a print category as one of the print setting items. In addition, in FIG. 11, "bookbinding" is selected as "imposition" of the print category, "weekly magazine" is selected as "mini-book/weekly magazine" that is the type of bookbinding, "left open/top open" is selected as "opening direction", "vertical" is selected as "document direction", "fit to print size" is selected as "enlargement/reduction", "No" is selected as "centering", "No" is selected as "rotation angle", "according to print settings" is selected as "creep correction", "check" is selected in the check box of "with cover", and "paper list" is selected as "selection method". In addition, on the imposition and bookbinding print setting screen G3 illustrated in FIG. 11, in the paper setting item of the cover, a paper list is displayed in a paper list field PLg, paper selection according to the paper list is designated, and a check box CB1 of "search in history" is not checked. In addition, on the imposition and bookbinding print setting screen G3 illustrated in FIG. 11, an "update" button B4 is displayed. The "update" button B4 is operated when acquiring the paper list database PD from the DFE devices Df1 to Dfn and displaying the paper list database PD in the paper list field PLg.

In addition, the check box CB1 of "search in history" is checked when sending a request for the display of a paper list in the paper list field PLg with reference to the history print settings stored in the history storage unit 83.

That is, as will be described later, when the check box CB1 of "search in history" is not checked, the setting value presentation unit 86 searches for a paper list for setting the paper type, which is a specific print setting value of paper that is a specific print setting item associated with a print category, only from the paper list database PD stored in the received data storage unit 82 with the print category as relevant print settings, and presents the paper list to the paper list field PLg. Then, when the check box CB1 of "search in history" is checked, the setting value presentation unit 86 acquires a paper list stored in the history print setting database RD of the history storage unit 83, among the paper lists searched from the paper list database PD, and presents paper list to the paper list field PLg.

Figure 11:
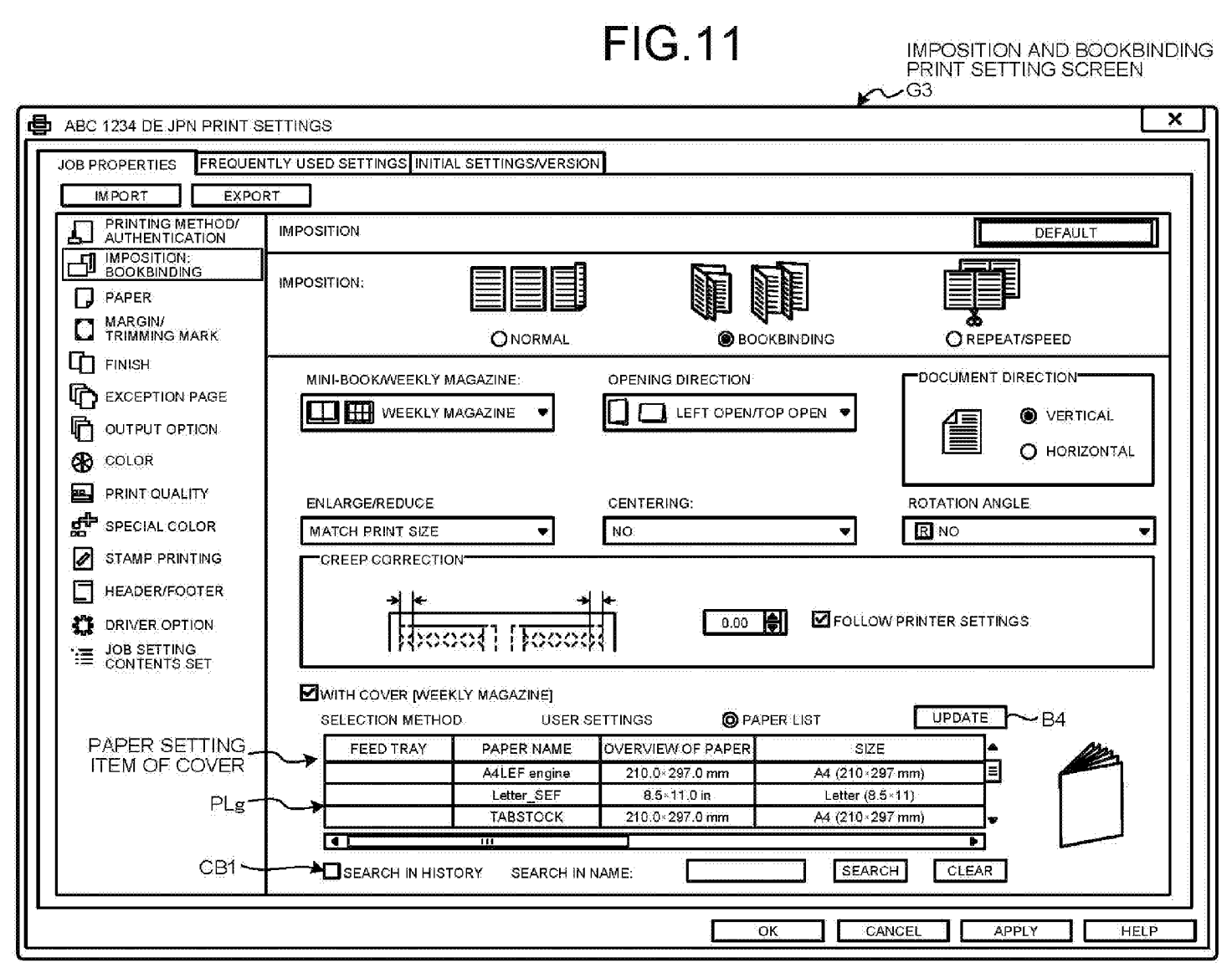

For example, when "bookbinding" is selected as "imposition", "weekly magazine" is selected as "mini-book/weekly magazine" that is the type of bookbinding, and "with cover" is selected on the imposition and bookbinding print setting screen G3 as illustrated in FIG. 11, the setting value presentation unit 86 narrows down "cover", which is paper used in weekly magazine printing, from the paper list database PD and the history print setting database RD, and displays the result as a paper list as illustrated in FIG. 12.

Figure 13:
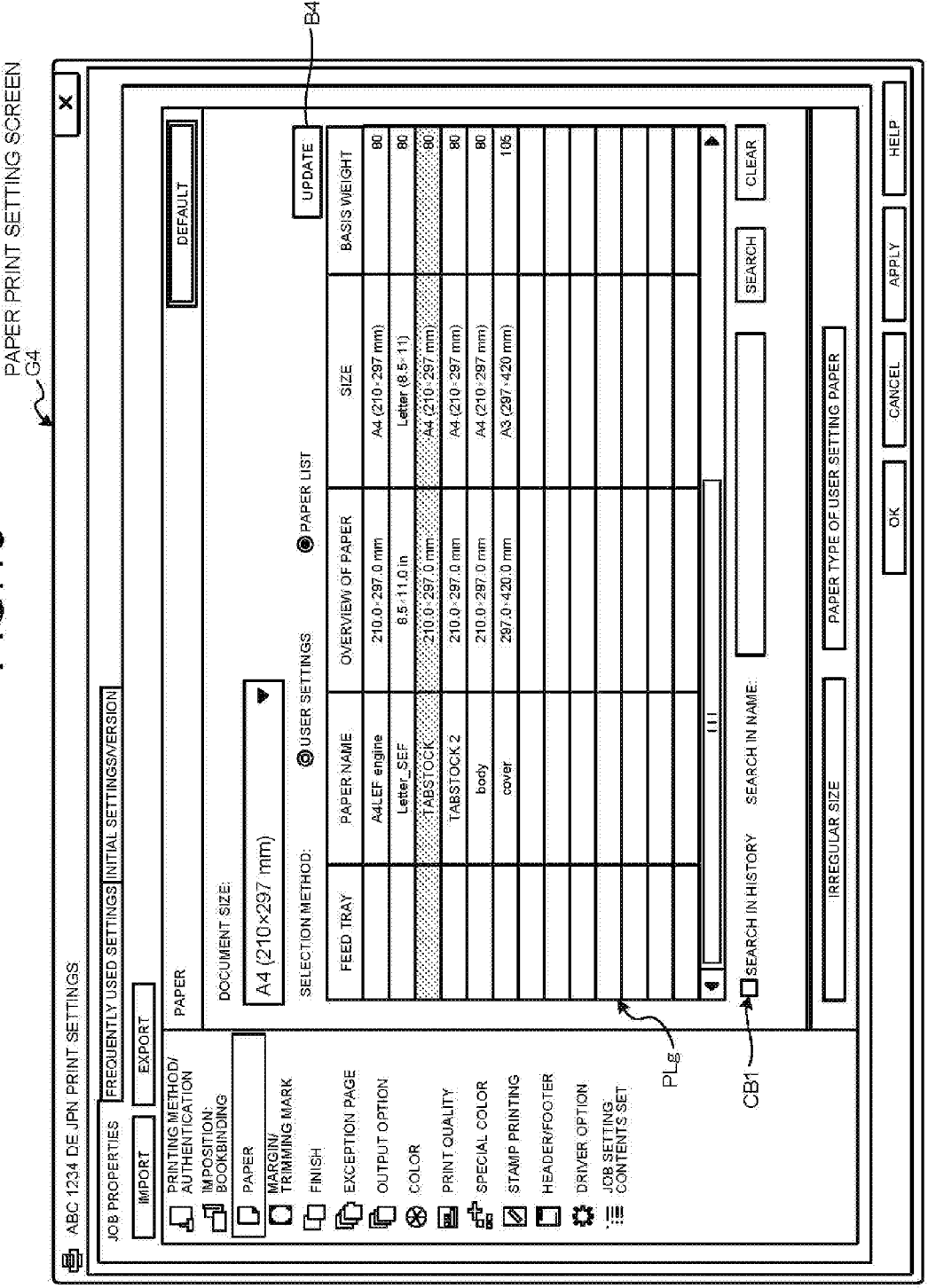
FIG. 13 is a diagram illustrating an example of a paper print setting screen.

Then, when paper is selected as a print setting item on the print setting screen, the print setting interface unit 84 displays a paper print setting screen G4 as illustrated in FIG. 13. Similar to the imposition and bookbinding print setting screen G3 illustrated in FIG. 11, not only a document size selection field but also selection check boxes of user settings and paper list, an "update" button B4, a paper list field PLg, a check box CB1 of "search in history", and the like are displayed on the paper print setting screen G4.

On the paper print setting screen G4, paper to be used in printing is selected from the paper list displayed in the paper list field PLg, for example, as shown by hatching in FIG. 13.

Based on the print setting values on the imposition and bookbinding print setting screen G3 that is a print category as a specific print setting item, the print setting interface unit 84 narrows down "job paper", for example, with reference to the paper list database PD illustrated in FIG. 14, and presents the result to the paper list field PLg.

In the same manner as described above, the check box CB1 of "search in history" is checked when displaying the paper list in the paper list field PLg with reference to the history print settings. When the check box CB1 of "search in history" is checked, for example, when "normal" is set on the imposition and bookbinding print setting screen G3 illustrated in FIG. 11, the setting value presentation unit 86 extracts job paper, which is paper used in normal printing, from the history print setting database RD, and displays the job paper in the paper list.

Figure 15:
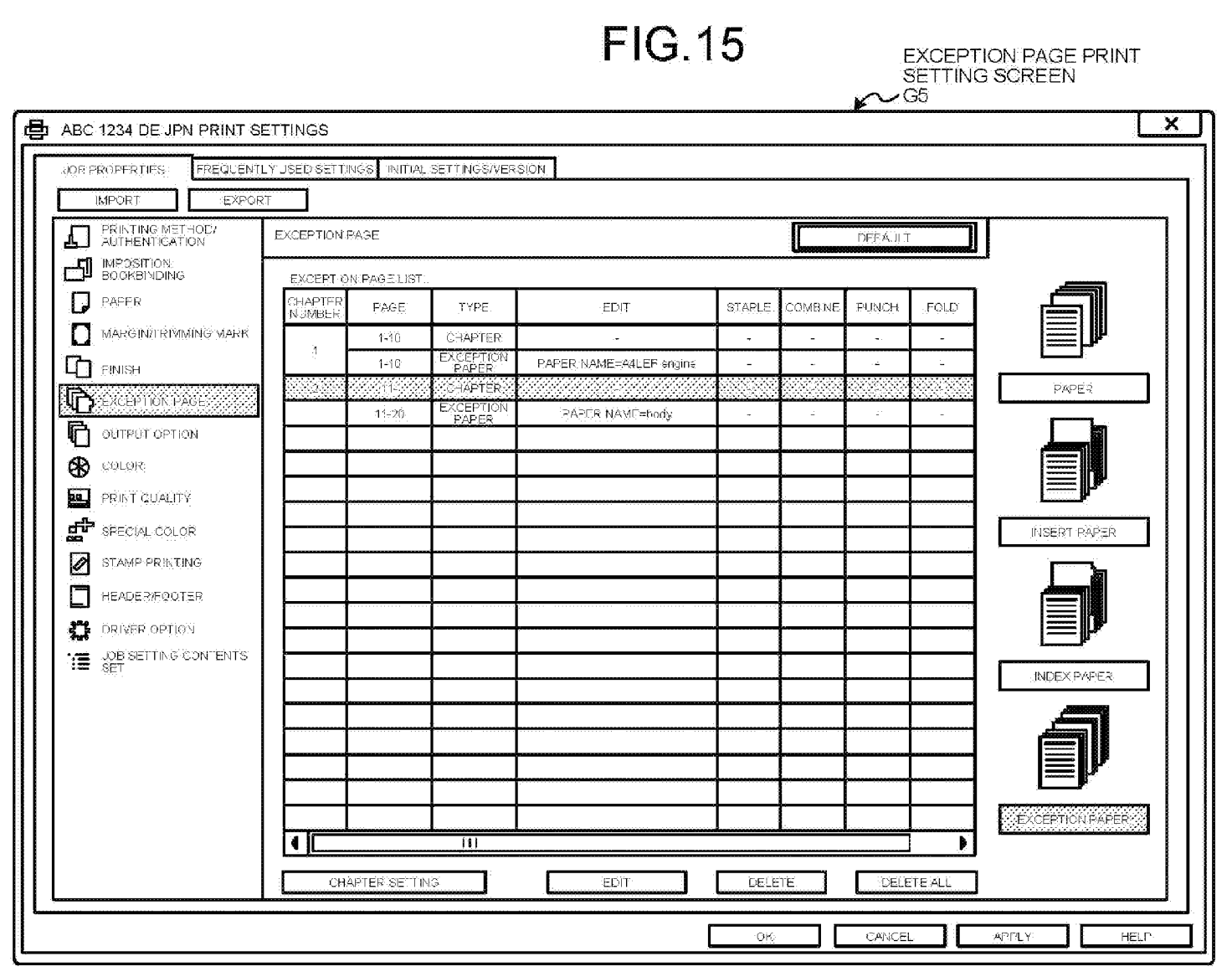

In addition, when an exception page is selected as a print setting item on the print setting screen, the print setting interface unit 84 displays an exception page print setting screen G5 as illustrated in FIG. 15. The print setting interface unit 84 displays an exception page list, an exception page paper selection field, and the like on the exception page print setting screen G5. In the exception page paper selection field, selection items of cover paper setting, insert paper setting, index paper setting, and exception paper setting are displayed.

In addition, settings of paper (cover, insert paper, index paper, and exception paper) of each exception page displayed in the exception page paper selection field are relevant to the print category on the imposition and bookbinding print setting screen G3 as illustrated in FIG. 16. That is, in FIG. 16, when the print category is "normal", it is possible to set all kinds of paper. However, when the print category is "mini-book" and "weekly magazine" of "bookbinding" and "speed" of "speed/repeat", only "exception paper" can be set. In addition, in FIG. 16, when the print category is "repeat" of "speed/repeat", it is possible to set paper other than "index paper".

In addition, FIG. 15 illustrates a state in which exception paper is selected in the exception page paper selection field. When an "application" button indicating selection and determination is operated in this state, the print setting interface unit 84 displays an exception paper print setting screen G6 as illustrated in FIG. 17.

Figure 17:
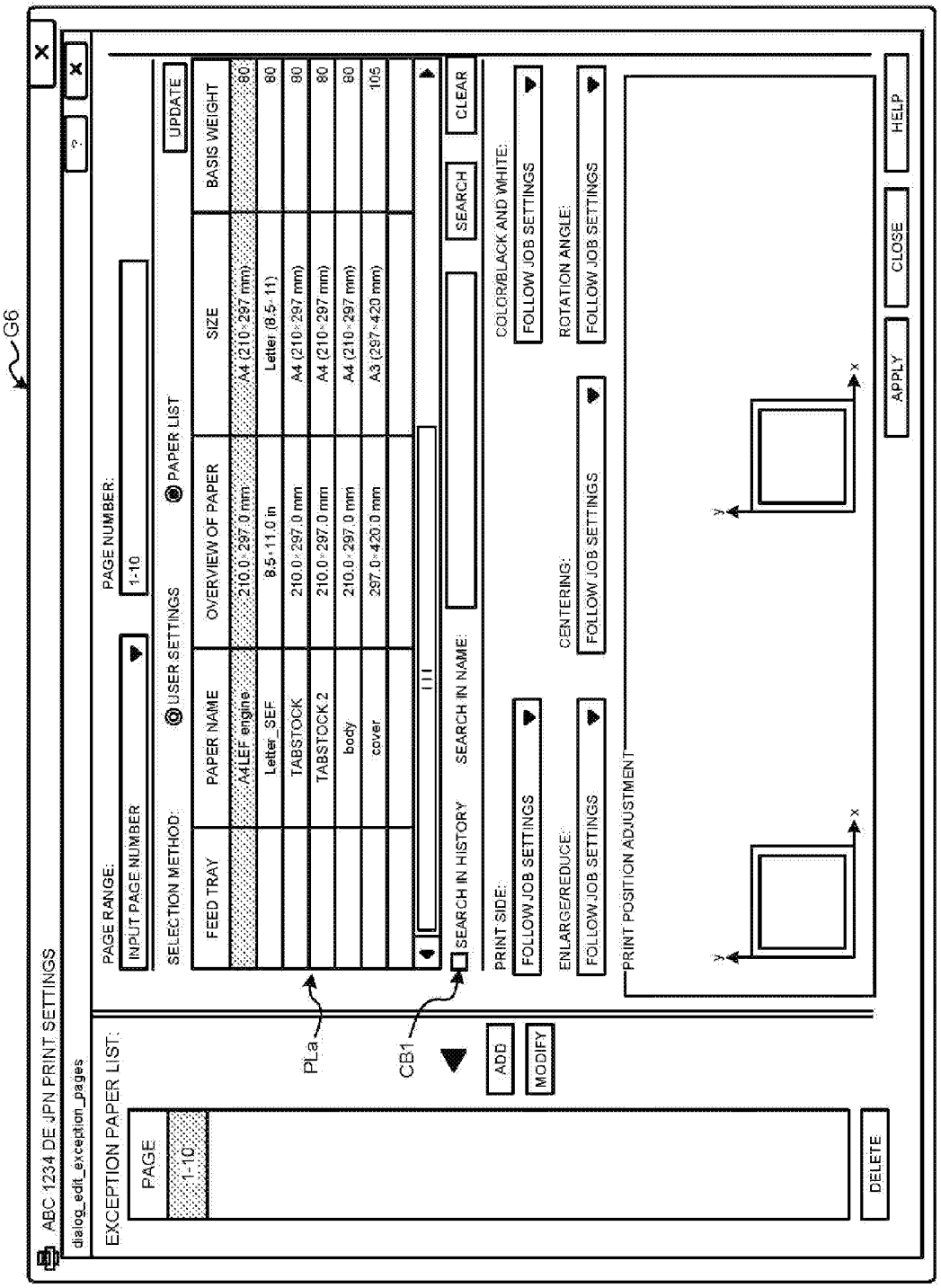
FIG. 17 is a diagram illustrating an example of an exception paper print setting screen.

The print setting interface unit 84 displays not only an exception paper list filed PLa but also the check box CB1 of "search in history" on the exception paper print setting screen G6 illustrated in FIG. 17. In the same manner as described above, the check box CB1 of "search in history" is checked when displaying the paper list in the exception paper list field PLa with reference to the history print settings. For example, when "speed" of "speed/repeat" of the print category is set on the imposition and bookbinding print setting screen G3, the setting value presentation unit 86 extracts paper used in speed printing from the history print setting database RD. The setting value presentation unit 86 presents the extracted paper to the print setting interface unit 84 for the paper list of the exception paper list field PLa.

That is, in print setting on the imposition and bookbinding print setting screen G3 illustrated in FIG. 11, the paper print setting screen G4 illustrated in FIG. 13, and the exception page print setting screen G5 illustrated in FIG. 15, the print setting interface unit 84 presents a paper list based on the paper list database PD in the imposition and bookbinding illustrated in FIG. 12, the paper list database PD in the job paper illustrated in FIG. 14, and the paper list database PD in the exception page illustrated in FIG. 16, respectively. Specifically, based on the paper list database PD illustrated in FIG. 4 including the paper list database PD in the imposition and bookbinding illustrated in FIG. 12, the paper list database PD in the job paper illustrated in FIG. 14, and the paper list database PD in the exception page illustrated in FIG. 16, the setting value presentation unit 86 presents a paper list to the print setting interface unit 84 according to the print category.

In this case, when the check box CB1 of "search in history" is not checked, the setting value presentation unit 86 performs a search using the paper list database PD based on the set and input print category and paper settings. The setting value presentation unit 86 causes the print setting interface unit 84 to display the paper list searched from the paper list database PD, for example, the paper list illustrated in FIG. 18, in the paper list field PLg of the print setting screens G1 to G6.

Then, in the computers PC1 to PCm, when the check box CB1 of "search in history" is checked, the setting value presentation unit 86 performs a search using not only the paper list database PD but also the history print setting database RD based on the set print category and paper settings, and presents paper lists registered in both the paper list database PD and the history print setting database RD to the print setting interface unit 84.

Specifically, in the computers PC1 to PCm, the history registration unit 87 acquires history print settings and registers the history print settings in the history print setting database RD of the history storage unit 83. In addition, in the computers PC1 to PCm, the paper list database PD acquired from the DFE devices Df1 to Dfn by the data request unit 81 is stored in the received data storage unit 82. The print setting interface unit 84 displays the print setting screens G1 to G6 or the like as print setting interfaces. The setting value presentation unit 86 searches for a paper list registered in the paper list database PD based on the print category and the paper settings, which are set on the print setting screens G1 to G6, and causes the print setting interface unit 84 to display the paper list in the paper list field PLg of the print setting screens G1 to G6. In addition, when the check box CB1 of "search in history" is checked on the print setting screens G1 to G6 that the print setting interface unit 84 displays as print setting interfaces, the setting value presentation unit 86 refers to the history print setting database RD of the history storage unit 83. The setting value presentation unit 86 presents paper lists, which are registered in both the paper list database PD and the history print setting database RD for the set print category and print settings, to the print setting interface unit 84.

Figures 18, 19:
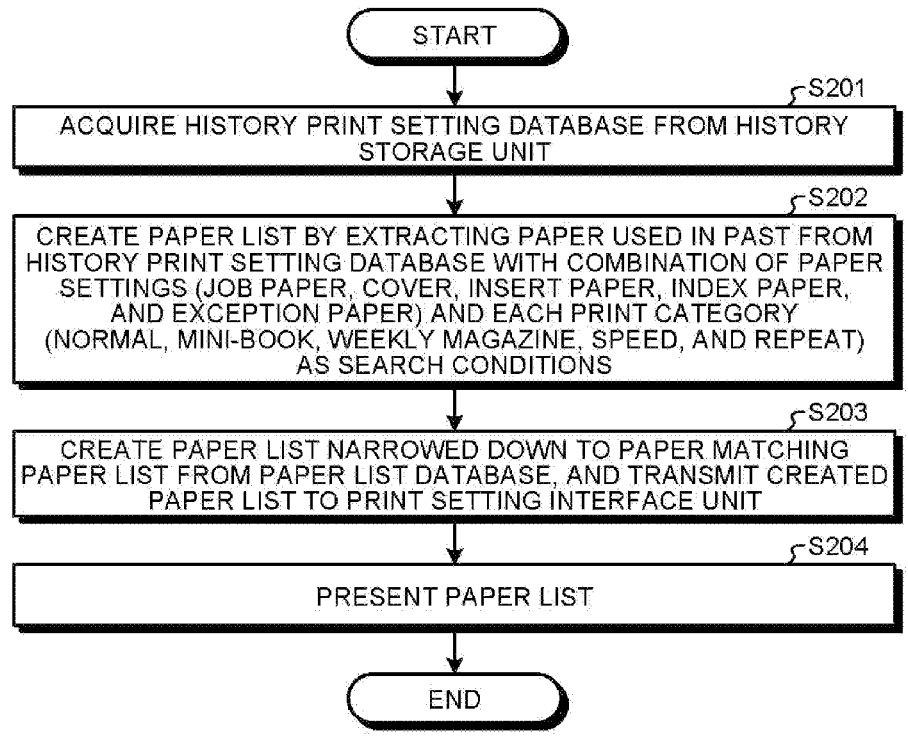
FIG. 18 is a diagram illustrating an example of a paper list extracted from only the paper list database.
FIG. 19 is a flowchart illustrating a paper list presentation process using the history.

That is, the setting value presentation unit 86 extracts a paper list in consideration of the history print settings by executing a paper list presentation process using the history illustrated in FIG. 19, and presents the paper list to the print setting interface unit 84.

When the check box CB1 of "search in history" is checked on the print setting screen, the setting value presentation unit 86 acquires the history print setting database RD from the history storage unit 83 as illustrated in FIG. 19 (step S201).

The setting value presentation unit 86 performs a search using the history print setting database RD with a combination of the paper settings (job paper, cover, insert paper, index paper, and exception paper) and the print category (normal, mini-book, weekly magazine, speed, and repeat), which have been input on each print setting screen, as the search conditions. The setting value presentation unit 86 extracts paper that matches the search conditions from the history print setting database RD. For example, in the example described above, the print category is "weekly magazine" and the paper settings are "cover". Accordingly, the setting value presentation unit 86 extracts history print settings underlined in the same history print setting database RD as in FIG. 6, which is illustrated in FIG. 20, and acquires paper "cover" of the cover to set it as a paper list as illustrated in FIG. 21 (step S202).

The paper settings are settings for the application of paper of a specific page of a printed matter (print result) that is set through a UI (User Interface) by the user. For example, in the printing of magazines or the like, different paper settings may be used in many cases for respective classifications, such as a cover and a color page and a black and white page inserted in some places. Therefore, in the printer driver of a printer used in commercial printing as in the present embodiment, as illustrated in FIG. 15, respective classifications can be set as different setting items in order to print the respective classifications (cover, insert paper, index paper, exception paper, and the like) in one print job.

Then, the setting value presentation unit 86 acquires a paper list of paper, which matches the paper acquired from the history print setting database RD, from the paper list database PD, for example, creates a paper list illustrated in FIG. 22, and transmits the paper list to the print setting interface unit 84 (step S203).

The print setting interface unit 84 presents the transmitted paper list by displaying the paper list on the display (step S204).

In addition, in the above explanation, a paper list in consideration of the history is created when the user puts a check on the check box CB1 of "search in history". However, list creation may be performed when an "update" button with respect to the paper list is pressed, for example. In this case, first, with a combination of the paper settings (job paper, cover, insert paper, index paper, and exception paper) and the print category (normal, mini-book, weekly magazine, speed, and repeat) that have been input as the search conditions, the setting value presentation unit 86 creates paper lists satisfying the search conditions from the paper list database PD. Then, when the check box CB1 of "search in history" is checked, the setting value presentation unit 86 extracts a paper list corresponding to the paper registered in the history print setting database RD, among the paper lists, and presents the paper list.

In addition, although the configuration of performing a search using the history print setting database RD and displaying the result as a paper list is shown above, the invention is not limited thereto. For example, since a new setting item that has not been used up to now may be selected, setting items that are not included in the history print setting database RD may also be displayed subsequent to setting items included in the paper list.

In commercial printing, printing is performed in a plurality of printing purposes, such as a weekly magazine and a flyer. However, it is assumed that paper to be used (paper for weekly magazines, paper for flyers, and the like) is limited by the printing purpose. On the other hand, since the same print category is assumed for the same printing purpose, the printing purpose is limited by the print category.

Therefore, according to the present embodiment, a paper type that is often used in the same print category is displayed at the top of choices, or only a paper type that has been used in the same print category is displayed as a choice. In this manner, in the printer driver for commercial printing for which it is assumed that a large number of paper types are registered in the printer driver, it is possible to shorten the time required to select the paper type corresponding to the printing purpose.

Thus, the computers PC1 to PCm of the printing system 1 of the present embodiment include: the print setting interface unit 84 that provides a print setting interface for setting print setting values for various print setting items; the data request unit 81 that acquires, as specific print setting data, a specific print setting item for which there are many print setting values to be set, among the print setting items, and a specific print setting value set for the specific print setting item; the history storage unit 83 that stores the print setting values, which are set for the print setting items by the print setting interface unit 84, as history print setting data; the relevant print setting value acquisition unit 85 that acquires a relevant print setting value, which is set by the print setting interface unit 84, for a relevant print setting item associated with the specific print setting item; and the setting value presentation unit 86 that acquires the specific print setting value associated with the relevant print setting value among print setting values registered in both the specific print setting data and the history print setting data and presents the acquired specific print setting value to the print setting interface unit 84 as a candidate for the specific print setting value for the specific print setting item.

Therefore, based on the relevant print setting item, it is possible to select specific print setting values registered in not only the specific print setting data but also the history print setting data, among a number of specific print setting values for the specific print setting item, and present the selected specific print setting values. As a result, it is possible to easily select a print setting value, which is suitable for an intended print result, for a print setting item for which there are many print setting values to be set in print setting.

In addition, the computers PC1 to PCm of the printing system 1 of the present embodiment execute an information processing method including the steps of: providing a print setting interface for setting print setting values for various print setting items; acquiring, as specific print setting data, a specific print setting item for which there are many print setting values to be set, among the print setting items, and a specific print setting value set for the specific print setting item; storing the print setting values, which are set for the print setting items at the step of providing the print setting interface, in the history storage unit 83; acquiring a relevant print setting value, which is set at the step of providing the print setting interface, for a relevant print setting item associated with the specific print setting item; and acquiring the specific print setting value associated with the relevant print setting value among print setting values registered in both the specific print setting data and the history print setting data and presenting the acquired specific print setting value, as a candidate for the specific print setting value for the specific print setting item, at the step of providing the print setting interface.

Therefore, based on the relevant print setting item, it is possible to select specific print setting values registered in not only the specific print setting data but also the history print setting data, among a number of specific print setting values for the specific print setting item, and present the selected specific print setting values. As a result, it is possible to easily select a print setting value, which is suitable for an intended print result, for a print setting item for which there are many print setting values to be set in print setting.

In addition, the computers PC1 to PCm of the printing system 1 of the present embodiment have a program causing a computer, such as the CPU 51, to execute: the steps of: providing a print setting interface for setting print setting values for various print setting items; acquiring, as specific print setting data, a specific print setting item for which there are many print setting values to be set, among the print setting items, and a specific print setting value set for the specific print setting item; storing the print setting values, which are set for the print setting items at the step of providing the print setting interface, in the history storage unit 83; acquiring a relevant print setting value, which is set at the step of providing the print setting interface, for a relevant print setting item associated with the specific print setting item; and acquiring the specific print setting value associated with the relevant print setting value among print setting values registered in both the specific print setting data and the history print setting data and presenting the acquired specific print setting value, as a candidate for the specific print setting value for the specific print setting item, at the step of providing the print setting interface.

Therefore, based on the relevant print setting item, it is possible to select specific print setting values registered in not only the specific print setting data but also the history print setting data, among a number of specific print setting values for the specific print setting item, and present the selected specific print setting values. As a result, it is possible to easily select a print setting value, which is suitable for an intended print result, for a print setting item for which there are many print setting values to be set in print setting.

In addition, the computers PC1 to PCm of the printing system 1 of the present embodiment further include the history registration unit 87 that, when setting of print setting values including the specific print setting value for the print setting items provided by the print setting interface unit 84 are determined, registers the print setting values for the print setting items in the history storage unit 83 as the history print setting data.

Therefore, since the history print setting data can be automatically updated, it is possible to select specific print setting values with reference to the most recent history print setting data and present the selected specific print setting values. As a result, it is possible to easily select a print setting value, which is more suitable for an intended print result, for a print setting item for which there are many print setting values to be set in print setting.

In addition, the computers PC1 to PCm of the printing system 1 of the present embodiment further include the print setting interface unit (designation unit) 84 that designates the relevant print setting item associated with the specific print setting item. The setting value presentation unit 86 acquires the specific print setting value from the specific print setting data and the history print setting data based on only relevant print setting item values that the relevant print setting value acquisition unit 85 acquires for the relevant print setting item designated by the print setting interface unit 84 as a designation unit, and presents the acquired specific print setting value as a candidate for the specific print setting value.

Therefore, it is possible to acquire a specific print setting value based on the relevant print setting item intended by the user and present the acquired specific print setting value as a candidate for the specific print setting value. As a result, it is possible to easily select a print setting value, which is more suitable for an intended print result, for a print setting item for which there are many print setting values to be set in print setting.

In addition, in the computers PC1 to PCm of the printing system 1 of the present embodiment, the specific print setting item is paper that is a recording medium on which an image is to be printed, the specific print setting value is a type of the paper (recording medium), and the relevant print setting item includes at least a print category.

Therefore, for a number of types of paper, a paper list as paper types registered in both the history print setting database RD and the paper list database PD can be presented as a paper list of print setting based on the print category. As a result, it is possible to easily select a paper type, which is more suitable for an intended print result, for a print setting item for which there are many paper types to be set in print setting.

In addition, the printing system 1 of the present embodiment is a printing system in which the computers PC1 to PCm, which are information processing apparatuses, and the printing units Pu1 to Pun, which are image forming apparatuses, are connected to each other through the network (communication line) NW and the printing units Pu1 to Pun print an image on paper (recording medium) in response to a print request from the computers PC1 to PCm. The DFE devices Df1 to Dfn of the printing units Pu1 to Pun include: the data storage unit 71 that stores, as specific print setting data, a specific print setting item for which there are many print setting values to be set, among print setting items, and a specific print setting value set for the specific print setting item; and the data providing unit 72 that provides the specific print setting data to the computers PC1 to PCm in response to a request from the computers PC1 to PCm. The computers PC1 to PCm include: the data request unit 81 that sends a request for transmission of the specific print setting data to the DFE devices Df1 to Dfn of the printing units Pu1 to Pun; the received data storage unit 82 that stores the specific print setting data provided from the DFE devices Df1 to Dfn; the print setting interface unit 84 that provides a print setting interface for setting print setting values for various print setting items; the history storage unit 83 that stores the print setting values, which are set for the print setting items by the print setting interface unit 84, as history print setting data; the relevant print setting value acquisition unit 85 that acquires a relevant print setting value, which is set by the print setting interface unit 84, for a relevant print setting item associated with the specific print setting item; and the setting value presentation unit 86 that acquires the specific print setting value associated with the relevant print setting value among print setting values registered in both the specific print setting data and the history print setting data and presents the acquired specific print setting value to the print setting interface unit 84 as a candidate for the specific print setting value for the specific print setting item.

Therefore, based on the relevant print setting item, it is possible to select specific print setting values registered in not only the specific print setting data but also the history print setting data, among a number of specific print setting values for the specific print setting item, and present the selected specific print setting values. As a result, it is possible to easily select a print setting value, which is suitable for an intended print result, for a print setting item for which there are many print setting values to be set in print setting.

In addition, the printing system 1 of the present embodiment is a printing method in a printing system in which the computers PC1 to PCm, which are information processing apparatuses, and the printing units Pu1 to Pun, which are image forming apparatuses, are connected to each other through the network (communication line) NW and the printing units Pu1 to Pun print an image on paper (recording medium) in response to a print request from the computers PC1 to PCm. The DFE devices Df1 to Dfn of the printing units Pu1 to Pun perform the steps of: storing a specific print setting item for which there are many print setting values to be set, among print setting items, and a specific print setting value set for the specific print setting item, as specific print setting data, in the data storage unit 71; and providing the specific print setting data to the computers PC1 to PCm in response to a request from the computers PC1 to PCm. The computers PC1 to PCm perform the steps of: sending a request for transmission of the specific print setting data to the DFE devices Df1 to Dfn; storing the specific print setting data provided from the DFE devices Df1 to Dfn in the received data storage unit 82; providing a print setting interface for setting print setting values for various print setting items; storing the print setting values, which are set for the print setting items at the step of providing the print setting interface, in the history storage unit 83 as history print setting data; acquiring a relevant print setting value, which is set at the step of providing the print setting interface, for a relevant print setting item associated with the specific print setting item; and acquiring the specific print setting value associated with the relevant print setting value among print setting values registered in both the specific print setting data and the history print setting data and presenting the acquired specific print setting value, as a candidate for the specific print setting value for the specific print setting item, at the step of providing the print setting interface.

Therefore, based on the relevant print setting item, it is possible to select specific print setting values registered in not only the specific print setting data but also the history print setting data, among a number of specific print setting values for the specific print setting item, and present the selected specific print setting values. As a result, it is possible to easily select a print setting value, which is suitable for an intended print result, for a print setting item for which there are many print setting values to be set in print setting.

In addition, in the printing system 1 of the present embodiment, the computers PC1 to PCm further include the history registration unit (history registration unit) 87 that, when setting of print setting values including the specific print setting value for the print setting items provided by the print setting interface unit 84 are determined, registers the print setting values for the print setting items in the history storage unit 83 as the history print setting data.

Therefore, since the history print setting data can be automatically updated, it is possible to select specific print setting values with reference to the most recent history print setting data and present the selected specific print setting values. As a result, it is possible to easily select a print setting value, which is more suitable for an intended print result, for a print setting item for which there are many print setting values to be set in print setting.

In addition, in the printing system 1 of the present embodiment, the specific print setting item is paper that is a recording medium on which an image is to be printed, the specific print setting value is a type of the paper (recording medium), and the relevant print setting item includes at least a print category.

Therefore, for a number of types of paper, a paper list as paper types registered in both the history print setting database RD and the paper list database PD can be presented as a paper list of print setting based on the print category. As a result, it is possible to easily select a paper type, which is more suitable for an intended print result, for a print setting item for which there are many paper types to be set in print setting.

Second Embodiment

FIGS. 23 to 27 are diagrams illustrating a second embodiment of the information processing apparatus, the printing system, the information processing method, the printing method, and the program.

The present embodiment is applied when the print setting item is a color profile and the print setting item value is color profile information.

In addition, the present embodiment is applied to the same printing system 1 as in the first embodiment described above. Therefore, in the explanation of the present embodiment, the reference numerals used in the first embodiment will be used as they are.

That is, in the printing system 1 of the present embodiment, a plurality of printing units Pu1 to Pun and a plurality of computers PC1 to PCm are connected to the network NW as in FIG. 1.

The printing units (image forming apparatuses) Pu1 to Pun include DFE devices Df1 to Dfn and image output devices Gk1 to Gkn, respectively. The image output devices Gk1 to Gkn are connected to the DFE devices Df1 to Dfn, respectively. The DFE devices Df1 to Dfn are respectively connected to the image output devices Gk1 to Gkn through at least either wired or wireless communication line L.

In addition, the printing system 1 is constructed as an information processing apparatus and an image forming apparatus for executing an information processing method and a printing method that enable easy selection of a color profile suitable for an intended print result, for a color profile for which there are many setting values in print setting, by reading programs for executing the information processing method and the printing method and loading the programs into the ROM 52 of the computers PC1 to PCm and the ROM 32 of the DFE devices Df1 to Dfn.

In the printing system 1 of the present embodiment, the same functional block as in FIG. 7 in the first embodiment is constructed by loading the programs for executing the information processing method and the printing method described above.

In addition, in the DFE devices Df1 to Dfn, a color profile database is stored in the nonvolatile memory 34. In the DFE devices Df1 to Dfn, the user can set color profiles using the input device 41, and register a plurality of color profiles in the color profile database of the nonvolatile memory 34.

In the case of the printing system 1, there are color profiles of an input color profile and an output color profile.

The input color profile is a color profile that is applied according to a device that imports the input color image data and the image type (sRGB, AdobeRGB, AppleRGB, or the like) when importing color image data handled in the printing system 1.

More specifically, the input color profile is for the conversion of color data from job data to PCS (Profile Connection Space) managed by device independent colors. Since the color space changes with the environment of created data, an input color profile that matches each environment is required. Such an input color profile can be created by a user or a vendor. The controller 10 performs color data conversion processing according to the input color profile selected by the driver by the user.

The output color profile is a color profile that is applied according to the printing units Pu1 to Pun, the type of a recording medium such as paper to be output, and the output type (1up printing, bookbinding printing, or the like) in order to print out the color image data in the printing units Pu1 to Pun.

More specifically, the output color profile is for the conversion of color data from the color space of the PCS to the color space of the printing units (image forming apparatuses) Pu1 to Pun. Since the color space differs depending on the printing units (image forming apparatuses) Pu1 to Pun or paper, a color profile that matches the printing units (image forming apparatuses) Pu1 to Pun or paper is required. Such an output color profile can be created by a user or a vendor. The controller 10 performs color data conversion processing according to the output color profile selected by the driver by the user.

That is, the controller 10 performs conversion of color data into the PCS with the input color profile for job data. Thereafter, the controller 10 performs conversion of the color data from the color space of the PCS to the color space of the printing units (image forming apparatuses) Pu1 to Pun with the output color profile with the data after the conversion as Input.

In addition, for the input color profile, if the input device or the file format of color image data is determined, an input color profile to be applied has already been determined in general. However, appropriate color conversion (color space conversion) may not be able to be obtained due to variations in input devices and the like. For this reason, a corrected input color profile may be used. In addition, for the output color profile, if the type of a recording medium at the output destination and the output format are determined, an output file to be applied has already been determined in general. However, appropriate color conversion may not be able to be obtained due to variations in output devices, variations in the output format and recording mediums, and the like. For this reason, a corrected output color profile may be used.

That is, in the printing system 1, a print request including color image data and print settings is transmitted to the DFE devices Df1 to Dfn of the printing units Pu1 to Pun from the computers PC1 to PCm, and the color image data is printed out by the image output devices Gk1 to Gkn of the printing units Pu1 to Pun. In color printing, it is common that the format of input image data is different from the format of output image data. Accordingly, it is necessary to perform data conversion of the input image data into the output image data. In this case, data conversion between the input image data and the output image data needs to be performed in appropriate color space. The color profile is used in order to reproduce appropriate colors in the data conversion.

Therefore, in the printing system 1 of the present embodiment, a plurality of color profiles are stored in a list format in the nonvolatile memory 34 of the DFE devices Df1 to Dfn, that is, in a data storage unit 71 so as to match at least the paper type (recording medium type). The color profile list is obtained by listing color profiles available in printing by the image output devices Gk1 to Gkn connected to the DFE devices Df1 to Dfn at the storage destination.

In addition, in the computers PC1 to PCm, when the print setting using the color profile is completed, the history registration unit 87 constructed by the CPU 51 registers history print settings including the color profile in the history storage unit 83 constructed by the nonvolatile memory 54. At this time, the history registration unit 87 stores a history color profile print setting database CD as illustrated in FIG. 23, for example. The history color profile print setting database CD illustrated in FIG. 23 is configured to include items of No., paper information, output information, an input color profile, and an output color profile.

Similar to the print category described above, the output information is information that classifies the type of printing (purpose of printing). As illustrated in FIG. 23, the output information is, for example, 1up printing in which data of one page of original data is allocated to one surface or bookbinding printing in which printed paper is folded into two parts by a post-processing machine.

The paper information is information regarding a recording medium, such as paper or a film, which is set through a UI (User Interface) by the user. As illustrated in FIG. 23, the paper information is, for example, paper types (plain paper, recycled paper, coated paper, matte paper, glossy paper, and the like). The paper information may be the name itself of the set paper, or may be the attributes or the like of paper stored as information regarding the set paper.

When print setting is completed, the history registration unit 87 acquires item values of the respective items described above from the print settings, and registers the item values in the history color profile print setting database CD of the history registration unit 87. Processing for registering the history of the print setting values including the color profile is the same as the history registration process illustrated in FIG. 10 except that items and item values that are acquired and registered are different. Therefore, detailed explanation thereof will be omitted.

Figure 24:
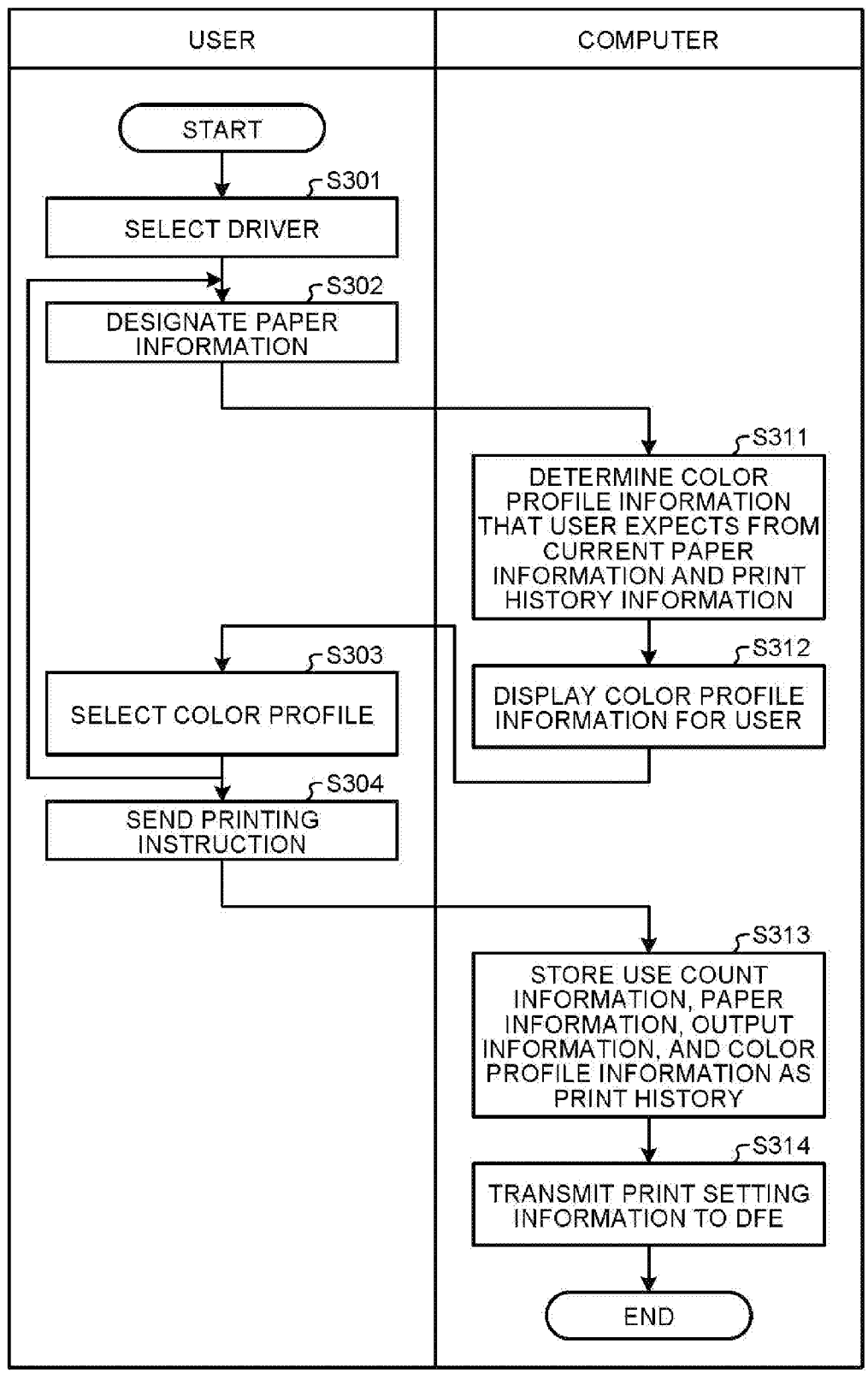
FIG. 24 is a flowchart illustrating a print setting process using history color profile print setting.

Then, the computers PC1 to PCm perform a print setting process using the history color profile print setting database CD as illustrated in FIG. 24. That is, as illustrated in FIG. 24, the user displays a print setting screen on the print setting interface unit 84 of the computers PC1 to PCm using the printer driver (step S301). The user designates paper information on the print setting screen (step S302).

In the computers PC1 to PCm, when the paper information is designated, the setting value presentation unit 86 performs a search using the history color profile print setting database CD based on the designated current paper information to acquire color profile information (step S311). The setting value presentation unit 86 transmits the acquired color profile information to the print setting interface unit 84, thereby presenting the color profile information in a method of displaying the color profile information on the print setting screen of the display (step S312). The print setting interface unit 84 presents the color profile information, for example, in a method of displaying the color profile information on the display as a color profile list.

Figure 25:
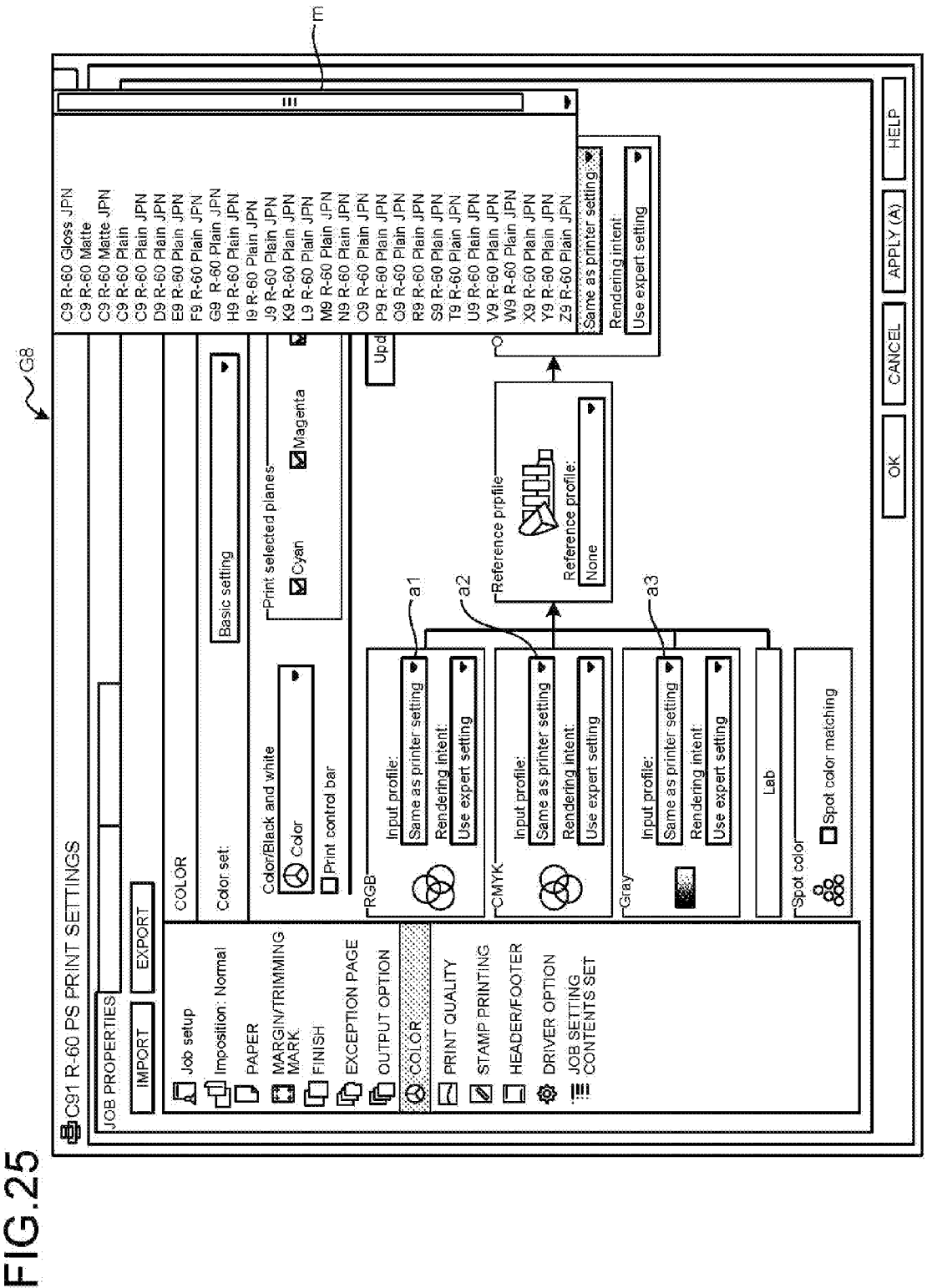
FIG. 25 is a front view illustrating an example of a print setting screen.

Here, FIG. 25 is a front view illustrating an example of a print setting screen G8 displayed on the display. The print setting screen G8 illustrated in FIG. 25 is a color profile setting screen displayed in step S312. On the print setting screen G8 illustrated in FIG. 25, a pull-down menu appears on condition that a down-arrow button in "Input profile" included in each of RGB, CMYK, and Gray is operated. In the pull-down menu, choices of the input color profile acquired in step S311 are displayed in a selectable manner. Items a1, a2, and a3 shown on the print setting screen G8 illustrated in FIG. 25 are input color profiles selected in the pull-down menu of "Input profile" included in each of RGB, CMYK, and Gray.

On the other hand, on the print setting screen G8 illustrated in FIG. 25, a state is shown in which choices of the output color profile acquired in step S311 are listed in the pull-down menu m of "Output profile" in a selectable manner. Here, an item selected in the pull-down menu m of "Output profile" is the output color profile.

In addition, although the configuration of performing a search using the history color profile print setting database CD and displaying the result as a color profile list is shown above, the invention is not limited thereto. For example, since a new setting item that has not been used up to now may be selected, setting items that are not included in the history color profile print setting database CD may also be displayed subsequent to setting items included in the color profile list.

The user selects a color profile in response to the presentation of color profile information using the print setting interface unit 84 (step S303). Then, the user designates paper information (step S302) or sends a printing instruction (step S304).

When the user designates paper information (step S302), the computers PC1 to PCm perform the same processing as described above (steps S311 and S312).

When the user sends a printing instruction after selecting the color profile (step S304), the computers PC1 to PCm acquire use count information, output information, paper information, and color profile information, and stores these pieces of information in the history color profile print setting database CD (step S313). That is, the history registration unit 87 acquires use count information, paper information, output information, an input color profile, and an output color profile among the print settings that have been set, and stores these in the history color profile print setting database CD of the history storage unit 83. The use count information is stored after incrementing the count of the number of times of use by one during the processing of step S313.

The computers PC1 to PCm transmit a print request including the set print setting information and print data to the DFE devices Df1 to Dfn, and end the print setting process (step S314).

Figure 26:
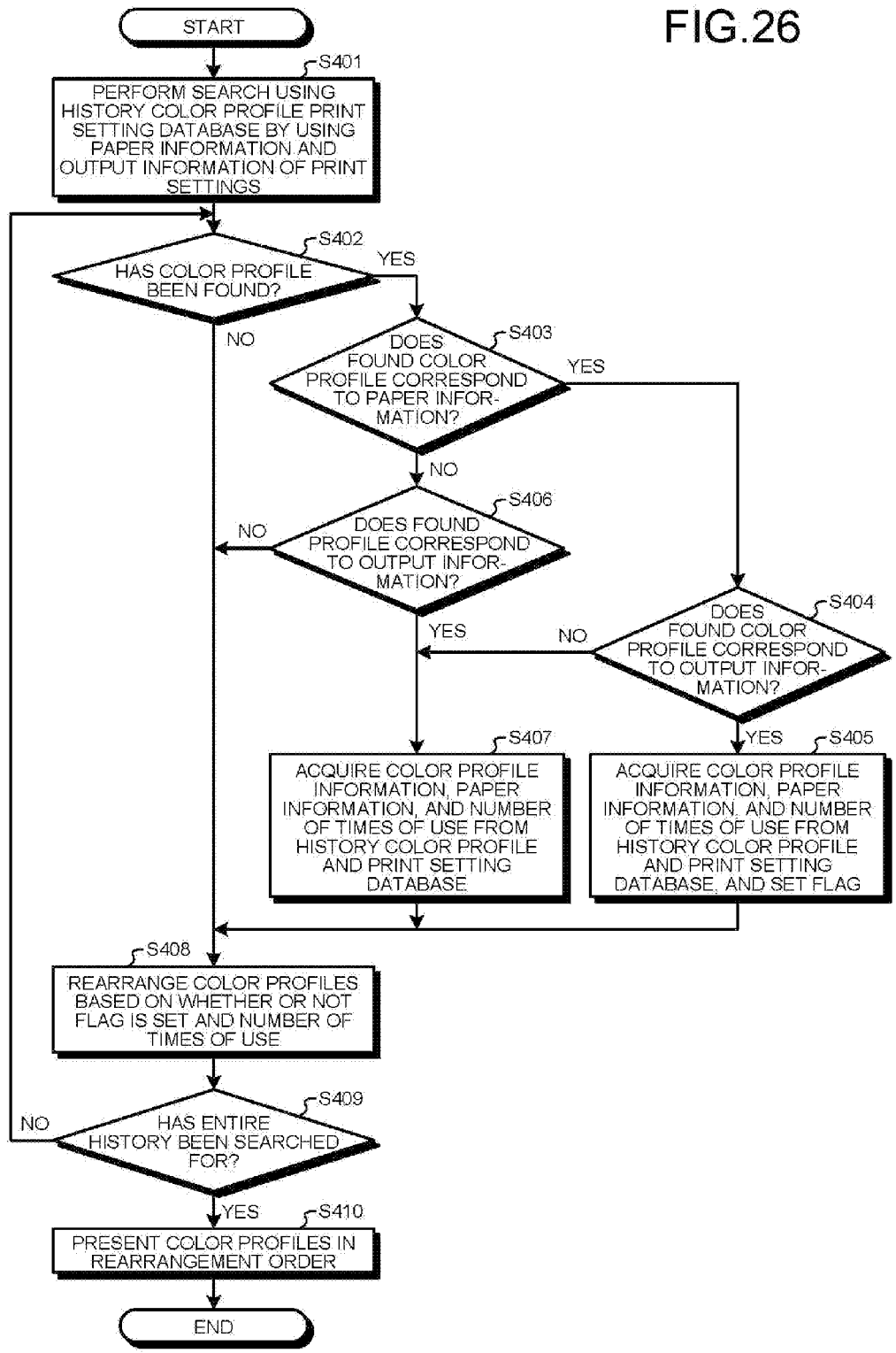
FIG. 26 is a flowchart illustrating a color profile selection process.
Figure 27:
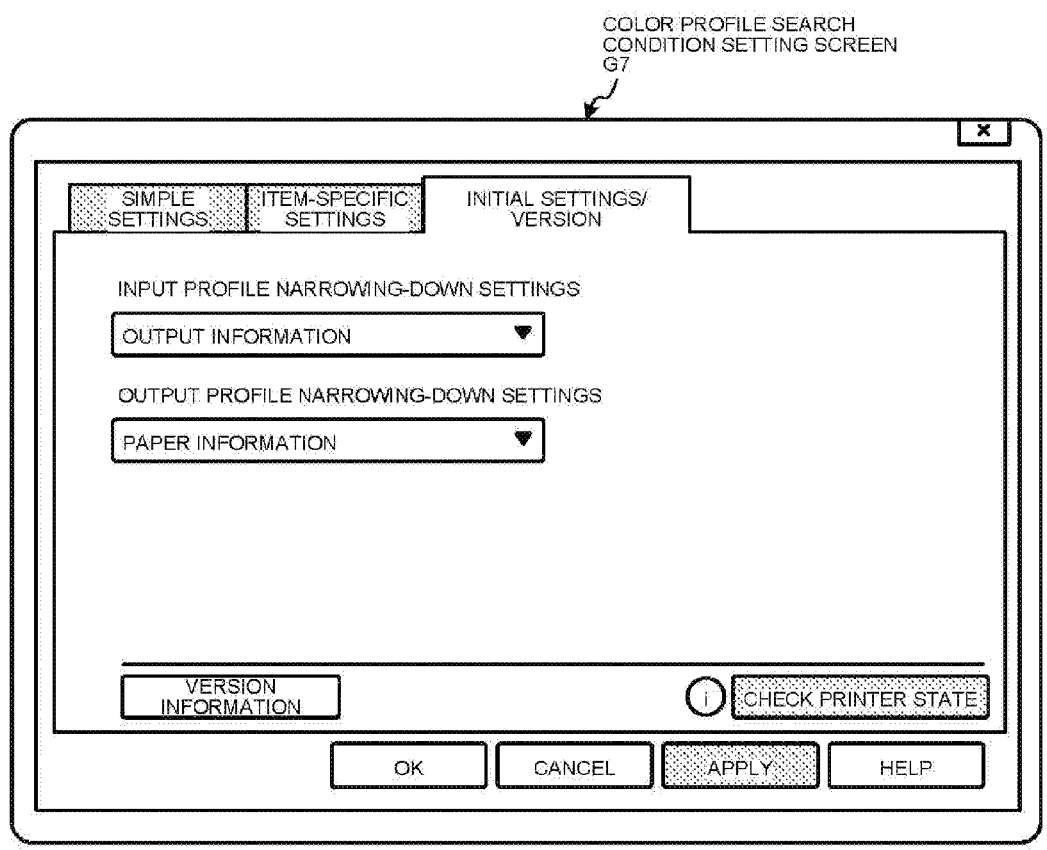
FIG. 27 is a diagram illustrating an example of a color profile search condition setting screen.

Then, in the computers PC1 to PCm, in the print setting process described above, the setting value presentation unit 86 performs a color profile selection process as illustrated in FIG. 26.

Once the setting of paper and output is performed on the print setting screen of the print setting interface unit 84, the setting value presentation unit 86 acquires the paper information and the output information and performs a search using the history color profile print setting database CD (step S401).

The setting value presentation unit 86 checks whether or not a color profile has been found (step S402). If a color profile has been found (in the case of Yes in step S402), the setting value presentation unit 86 checks whether or not the found color profile is a color profile corresponding to the paper information of the print settings (step S403). If the color profile has not been found (in the case of No in step S402), the setting value presentation unit 86 proceeds directly to step S408.

If the color profile corresponds to the paper information in step S403 (in the case of Yes in step S403), the setting value presentation unit 86 checks whether or not the color profile is a color profile corresponding to the output information of the print settings (step S404).

If the color profile is a color profile corresponding to the output information in step S404 (in the case of Yes in step S404), the setting value presentation unit 86 acquires information from the history color profile print setting database CD, and sets a flag (step S405). That is, the setting value presentation unit 86 acquires color profile information, paper information, and use count information of the relevant color profile from the history color profile print setting database CD, and sets a flag. The flag is set when the color profile corresponds to both the paper information and the output information. If the color profile is not a color profile corresponding to the output information (in the case of No in step S404), the setting value presentation unit 86 proceeds directly to step S408. Once the information acquisition and the flag setting are performed, the setting value presentation unit 86 rearranges color profiles (step S408).

If the color profile does not correspond to the paper information in step S403 (in the case of No in step S403), the setting value presentation unit 86 checks whether or not the color profile is a color profile corresponding to the output information of the print settings (step S406).

If the color profile is a color profile corresponding to the output information in step S406 (in the case of Yes in step S406), the setting value presentation unit 86 acquires information from the history color profile print setting database CD (step S407). That is, the setting value presentation unit 86 acquires color profile information, paper information, and use count information of the relevant color profile from the history color profile print setting database CD (step S407). If the color profile is not a color profile corresponding to the output information (in the case of No in step S406), the setting value presentation unit 86 proceeds directly to step S408. After the information acquisition, the setting value presentation unit 86 rearranges color profiles (step S408).

If the color profile is a color profile that does not correspond to the output information in step S406 (in the case of No in step S404), the setting value presentation unit 86 rearranges color profiles (step S408).

The setting value presentation unit 86 rearranges color profiles based on whether or not a flag is set, the number of times of use, and other items.

After the rearrangement of color profiles, the setting value presentation unit 86 checks whether or not all history color profiles in the history color profile print setting database CD have been searched for (step S409).

If all history color profiles have not been searched for in step S409 (in the case of No in step S409), the setting value presentation unit 86 returns to step S402 to perform the processing described above (steps S402 to S409).

If all history color profiles have been searched for in step S409 (in the case of Yes in step S409), the setting value presentation unit 86 presents the color profiles to the print setting interface unit 84 in the rearrangement order (step S410). The print setting interface unit 84 presents the rearranged color profiles, for example, in a method of displaying the color profiles on the display in a list format.

In the print setting described above, the computers PC1 to PCm perform a search for a color profile using output information and paper information as relevant print items. However, the user can appropriately select relevant print items to be used in the search. That is, the print setting interface unit 84 displays, for example, a color profile search condition setting screen G7 illustrated in FIG. 27 on the display, and enables the setting of output information and paper information as narrowing-down settings of the input profile and the output profile. As an input profile narrowing-down setting item, it is possible to select "set output information" or "set nothing". As an output profile narrowing-down setting item, it is possible to select "set paper information" or "set nothing". That is, the print setting interface unit 84 allows "set both output information and paper information", "set either output information or paper information", and "set neither of output information and paper information" as color profile search conditions.

If only the paper information is set in the search conditions setting, the setting value presentation unit 86 specifies color profile information from the history color profile print setting database CD based on only the paper information. In addition, if only the output information is set in the search conditions setting, the setting value presentation unit 86 specifies color profile information from the history color profile print setting database CD based on only the output information. In addition, if both the paper information and the output information are set in the search conditions setting, the setting value presentation unit 86 specifies color profile information from the history color profile print setting database CD based on both the paper information and the output information. In addition, if neither of the paper information and the output information are set in the search conditions setting, the setting value presentation unit 86 always uses information set by the user without changing the color profile information according to the paper information or the output information. In addition, since a search for the input profile is specified from the output information in many cases, the output information is set as default settings on the color profile search condition setting screen G7. In addition, since a search for the output profile is specified from the paper information in many cases, the paper information is set as default settings on the color profile search condition setting screen G7.

In commercial printing, different types of color profiles are often used according to the printing purpose or the type of paper.

Therefore, according to the present embodiment, a color profile that is often used in the same print output information or paper information is displayed at the top, or only the choice of a color profile that has been used in the same print output information or paper information is displayed. In this manner, in the printer driver for commercial printing for which it is assumed that a large number of color profiles (tens of types of color profiles or more) are registered, it is possible to shorten the time required to select a color profile corresponding to the printing purpose or the paper type.

Thus, in the printing system 1 and the computers PC1 to PCm of the present embodiment, the specific print setting item is a color profile, the specific print setting value is color profile information, and the relevant print setting item includes at least either a print category or paper (recording medium).

Accordingly, for a number of types of color profile information, color profile information registered in both the history color profile print setting database CD and the color profile list can be presented as a color profile information list of print settings based on at least either a print category or a paper. As a result, it is possible to easily select color profile information, which is more suitable for an intended print result, for a color profile setting item for which there is a number of color profile information to be set in print setting.

According to the embodiments described above, it is possible to easily select a print setting value, which is suitable for an intended print result, for a print setting item for which there are many print setting values to be set in print setting.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
circuitry configured to
provide a print setting interface for setting one or more print setting values for various respective print setting items;
receive, via the print setting interface, user settings of the one or more print setting values for the respective print setting items;
acquire, as specific print setting data, a specific print setting item for which there are plural print setting values to be set, among the print setting items, and at least one specific print setting value set for the specific print setting item;
acquire at least one relevant print setting value amongst the one or more print setting values set via the print setting interface, for a relevant print setting item amongst the various print setting items, the relevant print setting item being associated with the specific print setting item;
acquire the at least one specific print setting value based on, and associated with, the at least one relevant print setting value amongst the one or more print setting values set via the print setting interface which are among print setting values registered in both the specific print setting data and history print setting data that represents the print setting values set for the print setting items; and
present the at least one acquired specific print setting value in the print setting interface as a candidate for the specific print setting value for the specific print setting item; and
a storage configured to store the history print setting data.

2. The information processing apparatus according to claim 1, wherein the circuitry is configured to further, when setting of print setting values including the specific print setting value for the print setting items are determined, register the print setting values for the print setting items in the storage as the history print setting data.

3. The information processing apparatus according to claim 1, wherein
the circuitry is configured to further designate the relevant print setting item associated with the specific print setting item, and
the circuitry is configured to
acquire the at least one specific print setting value from the specific print setting data and the history print setting data based on only the acquired relevant print setting item values for the designated relevant print setting item; and
present the acquired at least one specific print setting value as a candidate for the specific print setting value.

4. The information processing apparatus according to claim 1, wherein
the specific print setting item is a recording medium on which an image is to be printed,
the specific print setting value is a type of the recording medium, and
the relevant print setting item includes at least a print category.

5. The information processing apparatus according to claim 1, wherein
the specific print setting item is a color profile,
the specific print setting value is color profile information, and
the relevant print setting item includes at least either a print category or a recording medium.

6. A printing system comprising:
an information processing apparatus; and
an image forming apparatus connected to the information processing apparatus through a communication line to print an image on a recording medium in response to a print request from the information processing apparatus, wherein the image forming apparatus includes
- a storage configured to store, as specific print setting data, a specific print setting item for which there are many print setting values to be set, among print setting items, and a specific print setting value set for the specific print setting item; and
- circuitry configured to provide the specific print setting data to the information processing apparatus in response to a request from the information processing apparatus, and the information processing apparatus includes
- circuitry configured to
  - send a request for transmission of the specific print setting data to the image forming apparatus,
  - provide a print setting interface for setting print setting values for various print setting items,
  - acquire a relevant print setting value set for a relevant print setting item associated with the specific print setting item,
  - acquire the specific print setting value associated with the relevant print setting value among print setting values registered in both the specific print setting data and history print setting data that is the print setting values set for the print setting items, and
  - present the acquired specific print setting value as a candidate for the specific print setting value for the specific print setting item; and
- a storage configured to store the specific print setting data provided from the image forming apparatus, and store the history print setting data.

7. The printing system according to claim 6, wherein the circuitry of the information processing apparatus is configured to further, when setting of print setting values including the specific print setting value for the print setting items are determined, register the print setting values for the print setting items in the storage as the history print setting data.

8. The printing system according to claim 7, wherein
the specific print setting item is a recording medium on which an image is to be printed,
the specific print setting value is a type of the recording medium, and
the relevant print setting item includes at least a print category.

9. The printing system according to claim 6, wherein
the specific print setting item is a color profile,
the specific print setting value is color profile information, and
the relevant print setting item includes at least either a print category or a recording medium.

10. An information processing method comprising:
providing a print setting interface for setting print setting values for various print setting items;
acquiring, as specific print setting data, a recording medium setting item for which there are plural print setting values to be set, among the print setting items, and a specific recording medium type set for the recording medium setting item;
storing the print setting values that are set for the print setting items in a history storage unit as history print setting data;
acquiring a relevant print setting value which is set via the print setting interface for a relevant print setting item associated with the recording medium setting item;
acquiring the recording medium setting value which is acquired based on, and is associated with, the relevant print setting value set via the print setting interface which is among print setting values registered in both the specific print setting data and the history print setting data; and
presenting the acquired recording medium setting value, as a candidate for the recording medium setting value for the recording medium setting item.

* * * * *